(12) United States Patent
Andrabi

(10) Patent No.: US 9,317,808 B2
(45) Date of Patent: Apr. 19, 2016

(54) PREDICTIVE SYSTEM FOR DESIGNING ENTERPRISE APPLICATIONS

(71) Applicant: Najeeb S. Andrabi, Cupertino, CA (US)

(72) Inventor: Najeeb S. Andrabi, Cupertino, CA (US)

(73) Assignee: TIBCO Software Inc., Palo Alto, CA (US)

( * ) Notice: Subject to any disclaimer, the term of this patent is extended or adjusted under 35 U.S.C. 154(b) by 191 days.

(21) Appl. No.: 13/837,252

(22) Filed: Mar. 15, 2013

(65) Prior Publication Data
US 2014/0279788 A1   Sep. 18, 2014

(51) Int. Cl.
G06N 5/00   (2006.01)
G06F 1/00   (2006.01)
G06N 5/04   (2006.01)
G06Q 10/04   (2012.01)

(52) U.S. Cl.
CPC . *G06N 5/04* (2013.01); *G06Q 10/04* (2013.01)

(58) Field of Classification Search
CPC ........... G06N 5/02; G06N 5/04; G06N 5/022; G06N 7/005
See application file for complete search history.

(56) References Cited

U.S. PATENT DOCUMENTS

| | | | |
|---|---|---|---|
| 6,993,743 B2 | 1/2006 | Crupi et al. | |
| 2004/0181500 A1* | 9/2004 | Huelsman et al. | 707/1 |
| 2007/0005531 A1 | 1/2007 | George et al. | |
| 2009/0116413 A1 | 5/2009 | George | |
| 2009/0204245 A1* | 8/2009 | Sustaeta et al. | 700/99 |
| 2009/0265683 A1 | 10/2009 | Salgar | |
| 2009/0313193 A1 | 12/2009 | Hawkins et al. | |
| 2010/0088664 A1 | 4/2010 | Khodabandehloo et al. | |
| 2012/0166364 A1 | 6/2012 | Ahmad et al. | |

OTHER PUBLICATIONS

International search report and written opinion of the international searching authority from PCT application No. PCT/US2014/029626 mailed Aug. 28, 2014.
Andrabi, Najeeb: Concurrently filed and commonly assigned U.S. Appl. No. 13/837,344, filed Mar. 15, 2013 entitled "Predictive System for Deploying Enterprise Applications."

* cited by examiner

Primary Examiner — Stanley K Hill
Assistant Examiner — Kalpana Bharadwaj
(74) *Attorney, Agent, or Firm* — Baker & McKenzie LLP

(57) ABSTRACT

Predictive systems for designing enterprise applications include memory structures that output predictions to a user. The predictive system may include an HTM structure that comprises a tree-shaped hierarchy of memory nodes, wherein each memory node has a learning and memory function, and is hierarchical in space and time that allows them to efficiently model the structure of the world. The memory nodes learn causes, predicts with probability values, and form beliefs based on the input data, where the learning algorithm stores likely sequence of patterns in the nodes. By combining memory of likely sequences with current input data, the nodes may predict the next event. The predictive system may employ an HHMM structure comprising states, wherein each state is itself an HHMM. The states of the HHMM generate sequences of observation symbols for making predictions.

36 Claims, 24 Drawing Sheets

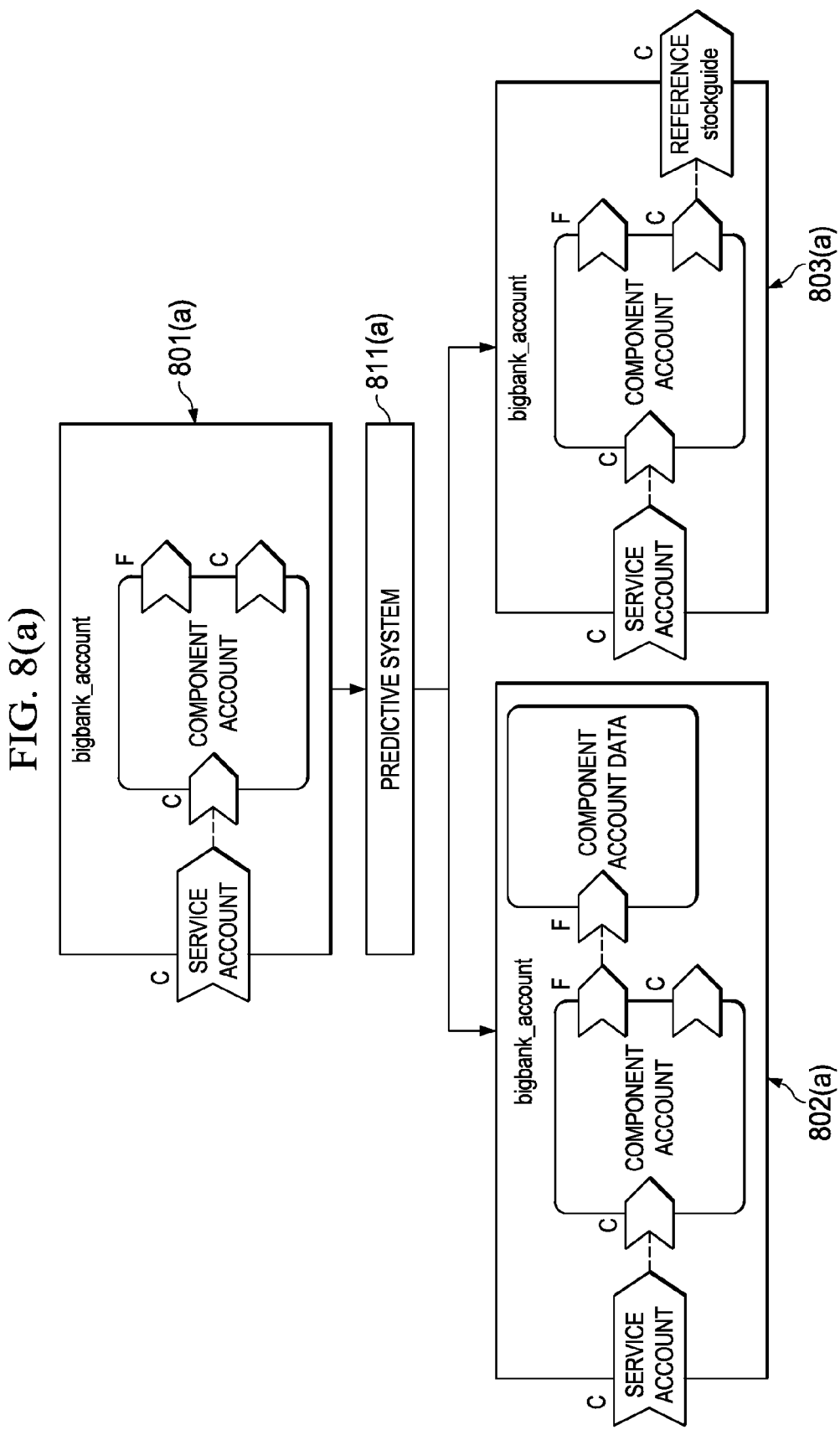

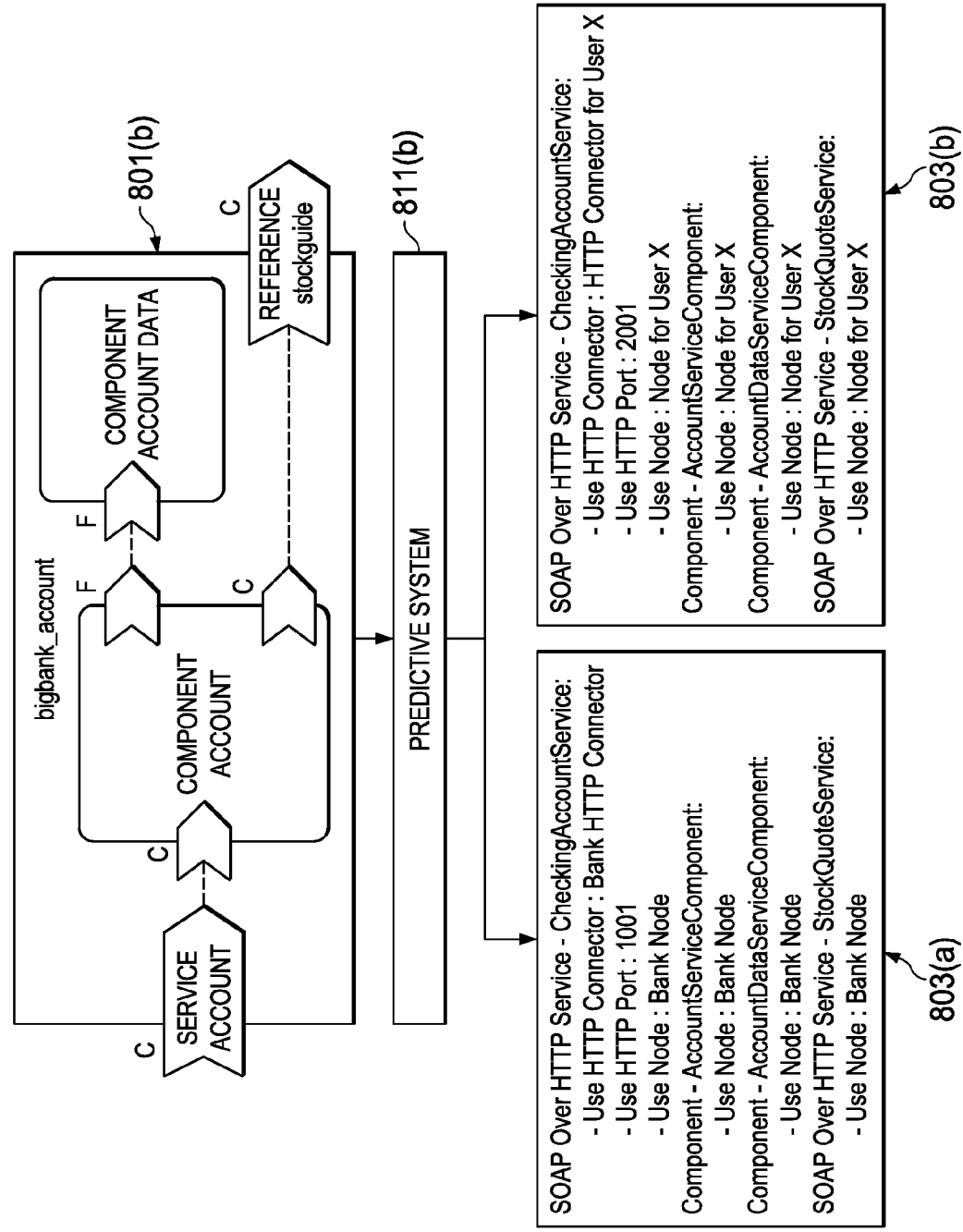

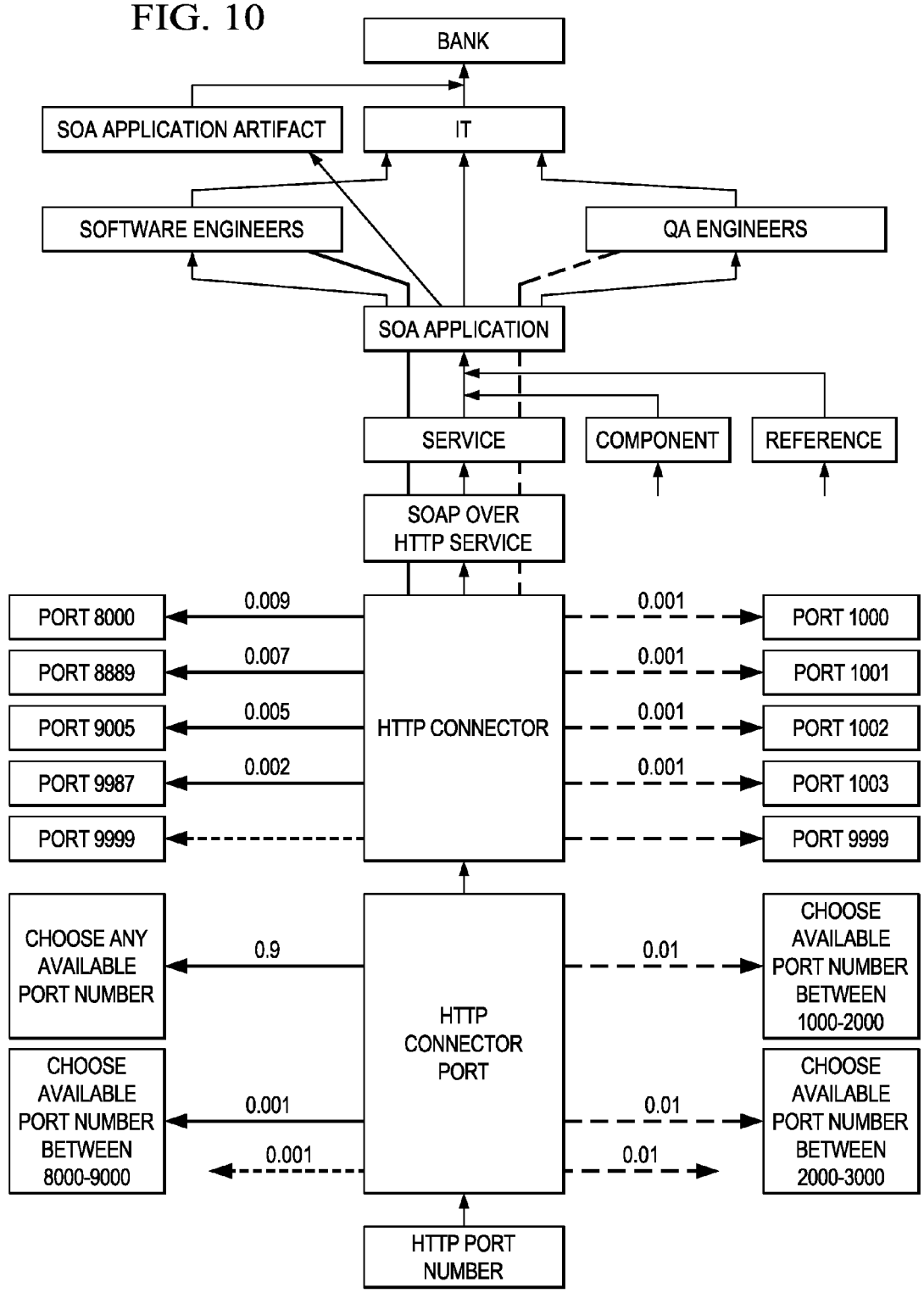

PREDICTIVE SYSTEM FOR DESIGNING ENTERPRISE APPLICATIONS

CROSS-REFERENCE TO RELATED APPLICATION

This application is related to concurrently filed and commonly assigned patent application Ser. No. 13/837,344, filed on Mar. 15, 2013 and entitled "Predictive System for Deploying Enterprise Applications," having Najeeb Andrabi as the inventor.

TECHNICAL FIELD

The disclosed embodiments relate generally to predictive systems for designing and deploying enterprise applications.

BACKGROUND

Conventional systems for improved designing or deploying of enterprise applications have historically focused on more effective processing engines or drawing and modeling frameworks. These systems include tools for designing and deploying enterprise applications, but these included tools have not addressed a common problem faced by users—that users have to repetitively perform similar tasks when designing or deploying enterprise applications. The users are thus not provided with an intelligent system that guides them through the design and deployment process. These systems are not "intelligent" because their tools focus on operating only on predefined instructions, which prevents them from recognizing patterns of enterprise application design and deployment. A substantial amount of time is therefore wasted by users repeating similar tasks when designing or deploying enterprise applications. This amount of time becomes especially great when the users are employees of a large corporation where similar design and deployment configurations and tasks are performed multiple times by multiple employees on a regular basis.

SUMMARY

An objective of the present disclosure is to reduce repetitive performance of similar tasks. This problem is solved by an artificial intelligent system that can predict a sequence of actions that a user may perform to design or deploy an enterprise application. This predictive system may employ a Hierarchical Temporal Memory (HTM) to eliminate the repetitions of tasks that encumber users in designing or deploying enterprise applications.

Hierarchical Temporal Memory (HTM) models receive great attention from various industries for their ability to learn and predict based on input data. Unlike standard computers that execute specific programs for solving particular problems, systems employing HTMs replicate the structural and algorithmic properties of a human neocortex, enabling them to "learn" to solve diverse problems based on the input data. Such systems are thus able to independently infer and continuously self-improve through stored data and new input data that are fed into their hierarchy. HTMs are consequently known for their potentials for approaching human level performance for cognitive tasks. HTMs are employed in different fields but have in the past been known for their applications in pattern recognition.

A predictive system for designing and deploying enterprise applications may include a Hierarchical Temporal Memory (HTM) structure comprising a tree-shaped hierarchy of memory nodes. Each memory node in the structure can have a learning and memory function. The nodes are hierarchical in space and time, allowing them to efficiently model real-world structures. The memory nodes can learn causes and temporal beliefs, predict with probability values, and form beliefs based on the input data. Through this learning algorithm, the system stores likely sequences of patterns in the nodes. By combining the stored memory of likely sequences with current input data, the nodes may predict the next event.

The predictive system may employ a Hierarchical Hidden Markov Model (HHMM) to perform the predictions and make inferences. An HHMM is a statistic model comprising states where each state is perceived as a self-contained probabilistic model. Each state of the HHMM is, thus itself an HHMM, which implies that its states generate sequences of observation symbols.

BRIEF DESCRIPTION OF THE DRAWINGS

For a more complete understanding of the present disclosure and its advantages, reference is now made to the following description taken in conjunction with the accompanying drawings, in which like reference numbers indicate like features, and:

FIG. 6(*h*) is a diagram illustrating an embodiment of an HTM receiving a SCA 1.1 composite component as an input;

FIG. 6(*i*) is a diagram of an embodiment of an HTM that predicts based on deconstructed SCA 1.1 composite input data;

FIGS. 8(*a*)-8(*b*) are schematic diagrams illustrating exemplary embodiments of a predictive system for outputting configuration options for designing applications and deploying applications, respectively;

FIG. 10 is a diagram illustrating an example HTM structure for predictive deploying for a bank software application.

DETAILED DESCRIPTION

Methods and systems are described below for predicting a process for designing or deploying enterprise applications. Previous systems have failed to address a common problem faced by users having to repetitively perform similar tasks. The presently disclosed system is a predictive system that employs Hierarchical Temporal Memories (HTMs), Hidden Hierarchical Markov Models (HHMMs), or other suitable predictive models to predict sequences of user actions for designing or deploying enterprise applications based on input data. The system makes constant predictions on the design and deployment configurations as a user designs or deploys an enterprise application. This reduces the amount of similar and redundant tasks that a user has to perform when designing or deploying enterprise applications. Furthermore, the predictive system for deploying configurations allows a new user or employee deploying an enterprise application to spend less time learning the different configuration options. HTMs have excellent ability to learn and predict and are therefore employed in embodiments of the present disclosure to predict a next sequence of steps when designing or deploying enterprise applications.

I. General HTM Structure

Figure 1:
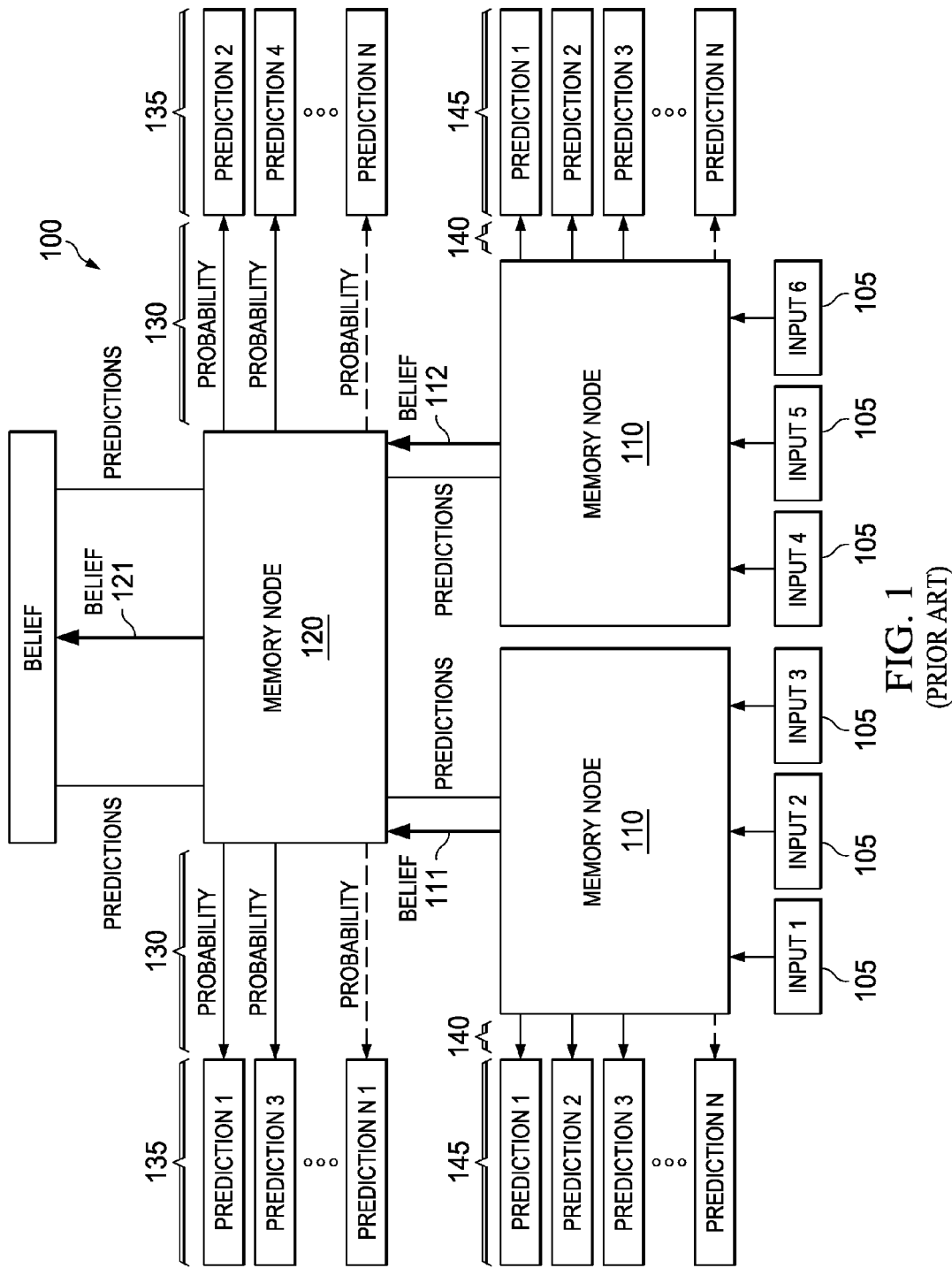
FIG. 1 is a schematic diagram illustrating a general HTM structure.

FIG. 1 is a schematic diagram illustrating an HTM structure 100. As used herein, the HTM structure 100 includes a hierarchy of levels 110 and 120, where the level 110 has two memory nodes and the level 120 has one memory node. Each memory node has temporal and spatial memory spaces for storing and processing information. The temporal memory space of each memory node stores sequential combinations of inputs that are often fed into the memory node as temporal groups. The spatial memory space of each memory node may also store combinations of the inputs that are often fed into the memory node at the same time as causes. The memory nodes at the level 110 are at the lowest level of the hierarchy and receive the inputs 105. The memory nodes at the level 110 identify temporal groups and causes of their inputs 105 by comparing the inputs 105 with the stored temporal groups and causes. Based on the comparison of the inputs 105 with the stored temporal groups and causes, the memory nodes at the level 110 may generate a specified or flexible number of predictions 145 with probability values 140. The predictions with highest probability values are passed on to the next level 120 as beliefs 111, 112. The newly identified temporal groups and causes are also stored in the temporal and spatial memory spaces of the memory nodes at the level 110.

The beliefs 111, 112 are fed into the memory node at the level 120 as inputs. The memory node at the level 120 may discover temporal groups and causes of its inputs, and generate a specified or flexible number of predictions 135 with probability values 130 based on stored temporal groups and causes. The memory node at the level 120 may output a belief 121 based on the predictions 135. The HTM structure 100 shows two levels of memory nodes in its hierarchy, but other HTM structures may have any number of levels.

In short, each memory node (e.g., memory nodes at levels 110, 120) receives inputs from lower levels, discovers temporal groups and causes of those inputs, and generates predictions 135, 145 with probability values 130, 140. The predictions 135, 145 with highest probability values are selected as beliefs (e.g., 111, 112). The generated beliefs are, in turn, passed onto a memory node at a next higher level as inputs.

This process continues until beliefs are generated for memory nodes at a highest level, which may be presented to a user as a predicted configuration option. Thus, all memory nodes are performing substantially the same learning algorithm, which means that each memory node in the HTM is performing the same function as the overall HTM. That is, each memory node looks at the spatio-temporal pattern of its input data and learns to discover temporal groups and causes of this input data. For their excellent ability to analyze input data and stored data to perform cognitive functions, HTMs have often been employed for pattern recognition purposes.

II. HTM for Pattern Recognition

Figure 2:
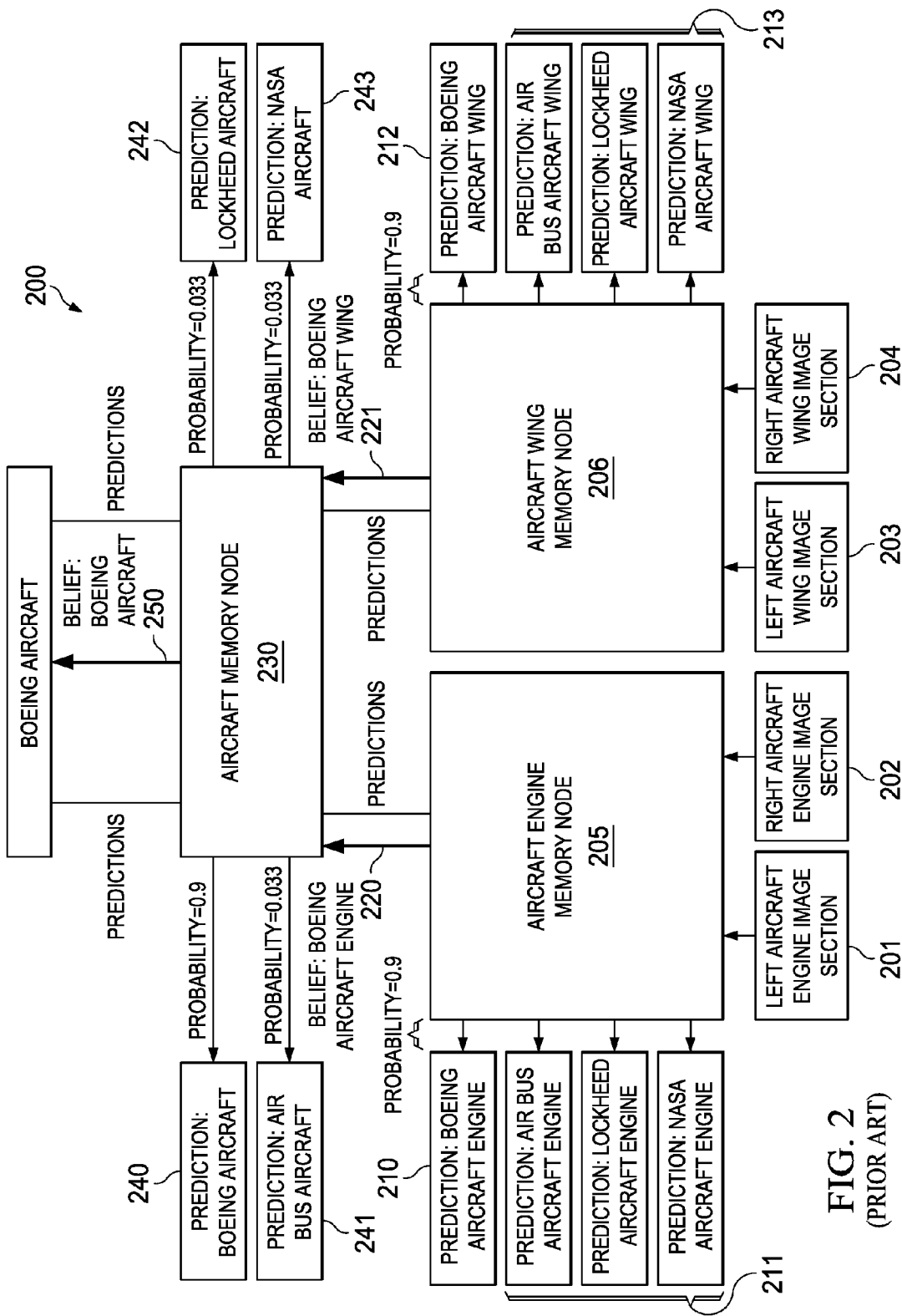
FIG. 2 is a schematic diagram illustrating an HTM structure employed for pattern recognition.

FIG. 2 is a schematic diagram illustrating an exemplary HTM system 200 for receiving images of different parts of an aircraft to recognize patterns and infer a name of an aircraft manufacturer. The HTM system 200 includes a hierarchy of levels having memory nodes 205, 206, 230. Each memory node may have temporal and spatial memory spaces. Inputs 201-204 at the lowest level of the hierarchy are images of different parts of an aircraft. The inputs 201 and 202 are images of a left aircraft engine section and a right aircraft engine section, respectively. The inputs 203 and 204 are images of a left aircraft wing section and a right aircraft wing section, respectively. The inputs 201 and 202 are fed into an Aircraft Engine Memory Node 205, and the inputs 203 and 204 are fed into an Aircraft Wing Memory Node 206.

The Aircraft Engine Memory Node 205 compares the inputs 201 and 202 with its stored data to discover causes of the inputs 201 and 202. Based on the causes, in the present embodiment, the Aircraft Engine Memory Node 205 predicts with 90% probability 210 that the inputs 201 and 202 correspond to a Boeing aircraft engine and with 10% probability 211 that the inputs 201 and 202 correspond to an aircraft engine manufactured by another company such as Air Bus, Lockheed, and NASA. The prediction that the inputs 201 and 202 correspond to a Boeing aircraft engine has a highest probability value, and is therefore passed up to an Aircraft Memory Node 230 as a belief 220 generated by the HTM system 200.

Similarly, the Aircraft Wing Memory Node 206 predicts with 90% probability 212 that the inputs 203 and 204 correspond to a Boeing aircraft wing and with 10% probability 213 that the inputs 203 and 204 correspond to an aircraft wing manufactured by another company. The prediction that the inputs 203 and 204 correspond to a Boeing aircraft wing has a highest probability, and is therefore passed up to the Aircraft Memory Node 230 as a belief 221. While not illustrated in FIG. 2, if the inputs 201 and 202 and the inputs 203 and 204 were respectively fed into the Aircraft Engine Memory Node 205 and the Aircraft Wing Memory Node 206 in a sequential and not concurrent manner, then the memory nodes 205 and 206 would also discover temporal groups of the inputs 201 and 202 and of the inputs 203 and 204.

The beliefs 220, 221 are fed into the Aircraft Memory Node 230 as inputs, and based on these inputs, the Aircraft Memory Node 230 discovers causes of its inputs 220, 221 and predicts with probability values 240-243. The Aircraft Memory Node 230 generates a belief 250 based on predictions with the highest probability values. The prediction that the inputs 220, 221 correspond to a Boeing aircraft has the highest probability, and is therefore generated as the belief 250 that the aircraft is a Boeing aircraft. The belief 250 may be output to a user. Once again, while not illustrated in FIG. 2, the Aircraft Memory Node 230 has the ability to discover temporal groups of its inputs as well. This illustrates how an HTM structure may be employed to recognize patterns. The foregoing discussion of FIGS. 1 and 2 are provided to illustrate the operation of exemplary pattern recognition systems employing HTMs to provide context for use of the types of models for the described inventive embodiments.

III. Predictive System Employing HTMs

Figure 3:
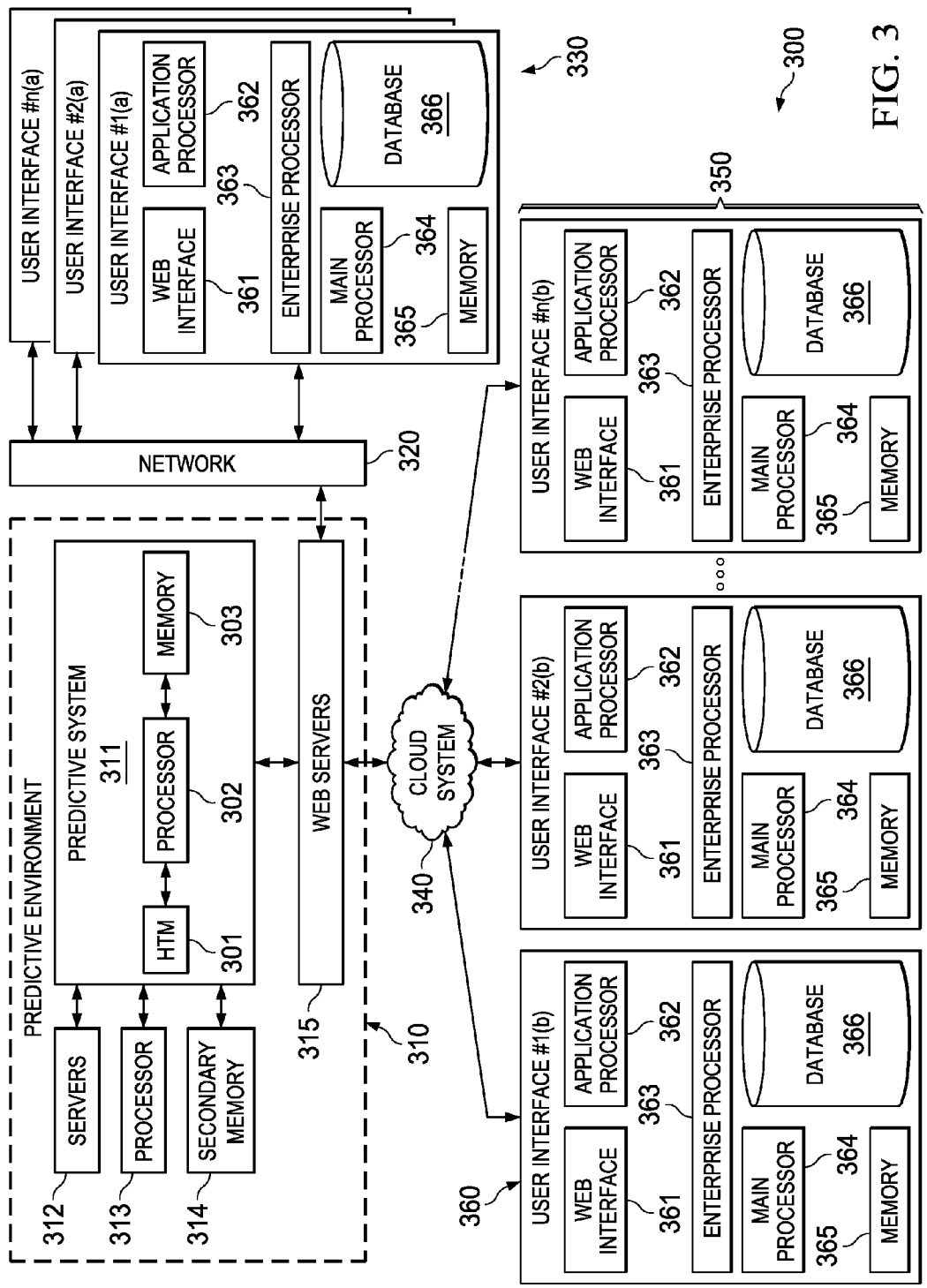
FIG. 3 is a system diagram illustrating an embodiment of a predictive configuration employing a predictive system connected to user interfaces via a network or a cloud system.

FIG. 3 is a high-level system diagram illustrating an embodiment of a predictive environment 310 for designing and deploying enterprise applications. The predictive environment 310 includes a predictive system 311 that communicates with servers 312, a processor 313, a secondary memory 314, and web servers 315. The predictive system 311 may include an HTM 301, a processor 302, and a secondary memory space 303. The HTM 301 may include a hierarchy of levels having memory nodes, wherein each memory node may have temporal and spatial memory spaces (as illustrated in FIG. 1 and FIG. 2). The memory 303 may store computer instructions for carrying out a prediction functionality and the processor 302 may execute the computer instructions stored in the memory 303. The HTM 301 provides prediction abilities for end-users that are accessing the predictive system 311. The predictive system 311 is operable to predict a next operation(s) or step(s) for designing an application or business process. Furthermore, the predictive system 311 is operable to predict configuration options and details for deploying an application. This is useful because it provides a user who is not acquainted with the application the ability to select different deployment configuration options.

The predictive system 311 may be operated securely and remotely from end users' user interfaces. Input data may be fed to the predictive system 311 by the users that are operating on their user interfaces. The predictive system 311 may be accessible to users through different means. In an embodiment, the predictive system 311 may be accessed by a group of user interfaces 330 via a network 320 or by a group of user interfaces 350 via a cloud system 340. While not shown in FIG. 3, the predictive system 311 may more specifically be accessed by a group of user interfaces via the Internet, the World Wide Web (WWW), or other communication networks. The group of user interfaces 330 may include user interfaces #1(a), #2(a), . . . #n(a), and the group of user interfaces 350 may include user interfaces #1(b), #2(b), . . . #n(b). Each user interface 360 may be an end user's local machine, which may include a web interface 361, an application processor 362, an enterprise processor 363, a main processor 364, a memory 365, a database 366, and/or other suitable components. The processor 364 may be a regular CPU of a computer. The user interfaces may essentially be any computing device, instance, or machine. And the memory 365 may be any readable-storage device such as CD-ROMs, read-only memories (ROMs), random access memories (RAMs), or floppy disks. While not illustrated in FIG. 3, the user interfaces may also include a voice recognition system or a display.

The users may access the HTM 301 of the predictive system 311 via the processor 364 that uses the web interface 361 and the application processor 362, which are connected to either the network 320 or the cloud system 340. By accessing the data stored inside the HTM 301, the users may access the predictive system 311 to predict the next sequence of actions for designing or deploying enterprise applications. The users transmit input data to the predictive system 311 by operating on a user interface via the network 320 or the cloud system 340. In an embodiment, the predictive system 311 may be used for managing an application. Here, the input data may comprise one or more of a profile of a user, a department, a company, and an enterprise application. In another embodiment, the input data may be associated with a task and a link used for creating a business process. Once the predictive system 311 receives the input data and completes the predictions via its HTM 301, it transmits the results back to the user interfaces via the network 320 or the cloud system 340.

In other embodiments, an HHMM structure or other suitable predictive models may be employed to provide similar prediction abilities. The predictive system 311 may be employed for designing, managing, monitoring, or deploying an application. The predictive system 311 may be coupled to different user applications for predicting the designing or deploying of enterprise applications. One possible user application may be an application design studio where a user designs an application by selecting a task and the predictive system 311 predicts a next task or tasks as options for the user. The application design studio may be Eclipse or other software development environments, or a web studio based on HTML 5, Scalable Vector Graphics (SVG), or other graphics languages. Furthermore, there may be similar embodiments employing the predictive system 311 to predict a sequence of actions for modeling, managing, or monitoring an application. Management and monitoring systems may be Administrators in Enterprise world. These are simply possible embodiments and the application design studio is not limited to these embodiments.

IV. Predictive Application Design

An embodiment of the predictive system shown in FIG. 3 may be employed more specifically for predictive application design. In an embodiment, the predictive system 311 employing HTMs 301 is used for predicting application designs based on WS-BPEL 2.0. In another embodiment, the predictive system 311 is used for predicting application designs based on Service Component Architecture (SCA) 1.1. The predictive system is capable of predicting the design involving WS-BPEL 2.0 and/or SCA, but other embodiments may involve other executable languages and architectures.

In an embodiment, a multiple level of hierarchy may be defined for an enterprise application. A top level may consist of the enterprise application model and a bottom level may consist of model components. Each of the model components would be a part of the application model. Table 1 shows model components in a case of BPEL process model. The application model is thus a collection of model components.

TABLE 1

| Model Component | Model Creation Actions |
|---|---|
| Receive Task | Create Receive Task -> name -> assign partner link |
| Invoke Task | Create Invoke Task -> name -> assign partner link |
| Reply Task | Create Reply Task -> name -> assign partner link |

For example, there may be three application models: (1) creating a process that receives a message and replies back; (2) a process that receives a message, invokes a service, and then replies; and (3) a process that receives a message, invokes a particular service based on the message content, and then replies. The person designing a process that receives a message and replies back will first have to create the process, name it, then create a receive task linked to the reply task.

The predictive system 311 is operable to predict a next task of an application model based on previously designed models and/or other relevant historical data. This embodiment employs an HTM 301, but other embodiments may employ an HHMM structure or other suitable models.

The user interface 301 may more specifically be an application design studio as shown in FIGS. 4(a)-4(b), FIG. 4(e), FIG. 4(f), and FIGS. 6(a)-6(d). In an embodiment, a user may select a task, which gets fed into the predictive system 311 as input data. Data of the task is fed into the predictive system 311's HTM 301, thereby accessing and activating a node that has the most similar pattern. The predictive system 311 will be able to predict a next design component, wherein the next design component may be a next task(s) and/or next link(s) in an embodiment. In other embodiments, the predictive system 311 may make two or more predictions. The predictive system 311 makes predictions based on the input data and prior data that its memory nodes have received. The HTM 301 is thereby continuously inferring and learning through experience and new input data. These predictions may be output to the user as options for the next action(s) to take for designing an application model.

Each memory node of the HTM 301 in the predictive system 311 may have spatial and temporal memory spaces that store combinations of inputs as causes and sequential combinations of inputs as temporal groups, respectively. Thus, when input data, in an embodiment, a particular task, is fed into a memory node, the memory node compares the input data with its stored causes and temporal groups, and the HTM 301 outputs a belief on what the next link or task should be. The belief will then be fed into a next higher level of the hierarchy of the HTM 301 as input data. The memory nodes at the next higher level of the hierarchy will compare the input data with their stored causes and temporal groups, and the HTM 301 outputs beliefs on what the next link or task should be. The belief at the highest level of the hierarchy of the HTM 301 will be transmitted to the user interface 360, which will then be presented to the user as an option for the next sequence of action of the design. The HTM 301 now has inferred causes and temporal groups from the input data saved in its memory nodes. Thus, the HTM 301 is continuously learning.

In an embodiment, a user may load the HTM 301 with initial causes and temporal groups so that it can begin inferring when new input data is fed into its nodes. The predictive system 311 performs these functions by having a memory 303 that stores computer instructions for carrying out the described methods and a processor 302 that actually executes the computer instructions. The predictive system 311 may be accessed by an end user using the application design studio via a cloud system or a local network. This allows accessibility for users located anywhere around the globe that has internet connection.

More specifically, the predictive system may predict design steps or operations of an enterprise application by storing and receiving different types of input data. The inferencing may be done using three different methods. It may be based on de-constructed process patterns based on topologies, process patterns, or process component patterns.

A. Based on Process Topology Patterns

Figure 4A:
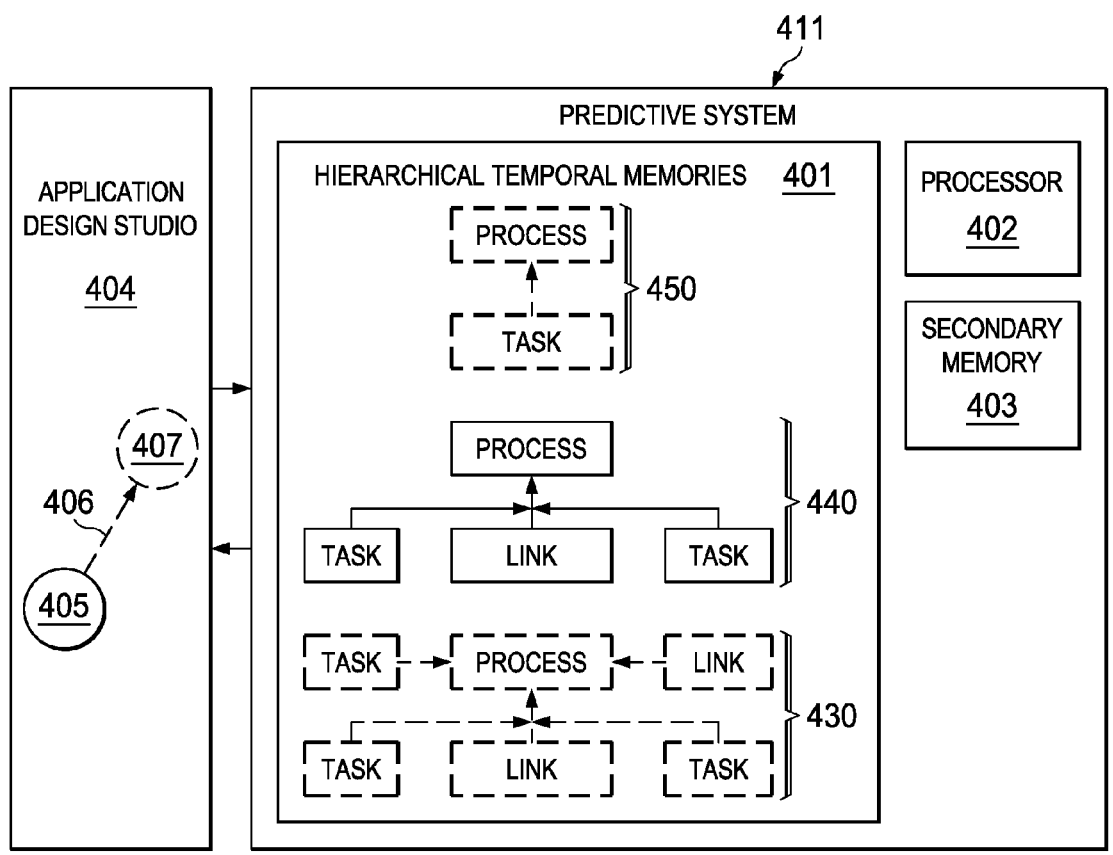
FIGS. 4(a)-4(b) are schematic diagrams illustrating embodiments of a predictive system for designing applications based on process topology patterns.
Figure 4B:
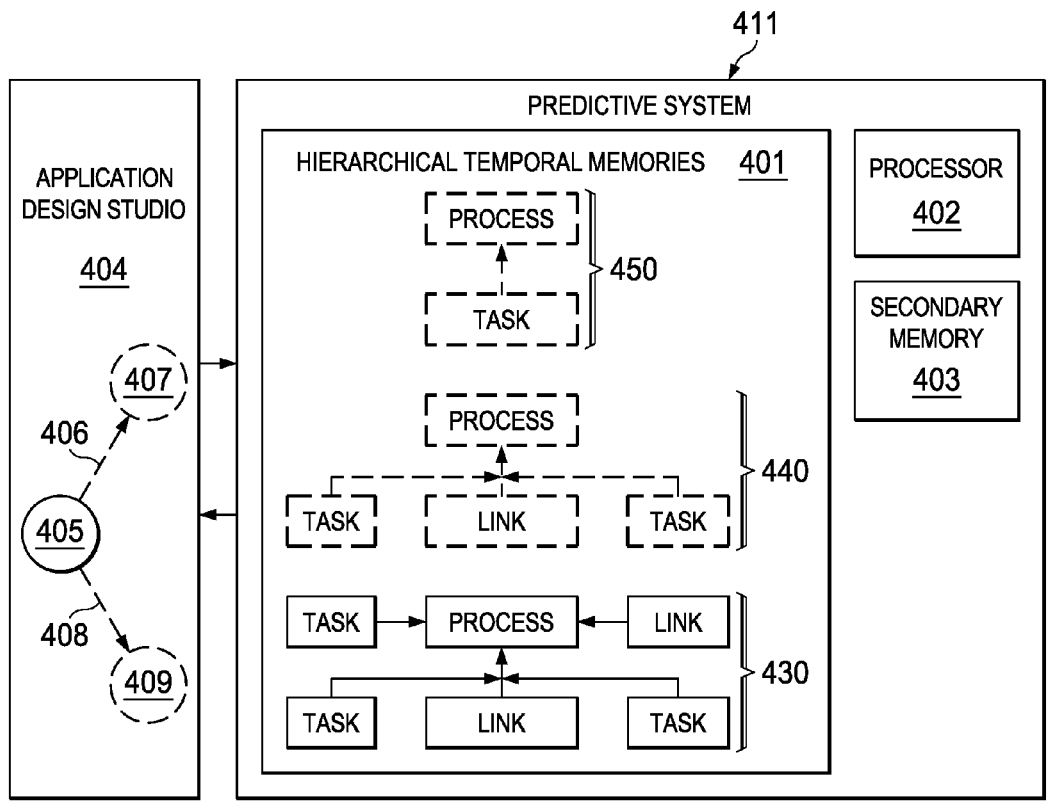

FIG. 4(a)-4(b) illustrate a predictive system 411 that stores and accepts input data from an application design studio 404. In an embodiment, the predictive system 411 may predict based on matching the topology of the application being constructed with its stored data until the design of the application for a set number of model creation steps is complete. The application model mapped on to the HTM has levels same as the hierarchy of the model that defines the application. Thus, the application prediction is based on creating the HTM for each of the model topologies that have been previously designed. In this embodiment, the form of data that the HTM 401 stores and receives is process topology patterns based on WPEL 2.0. The HTM 401 receives deconstructed process topology patterns for a task 405 as input. The HTM 401 then determines and activates the nodes that have the most similar data as the input data. In this embodiment, the accessed and activated nodes are represented with bold lines (e.g. node 440) while non-activated nodes (e.g. nodes 430, 450) are represented with dotted lines. The predictive system 411 then predicts a next link 406 and a next task 407, which are presented to the user as an option for the next action to take, as shown in FIG. 4(a). Other embodiments may provide the next link 406, the next task 407, a next link 408, and a next task 408 as different options for the user, as shown in FIG. 4(b).

Figure 4C:
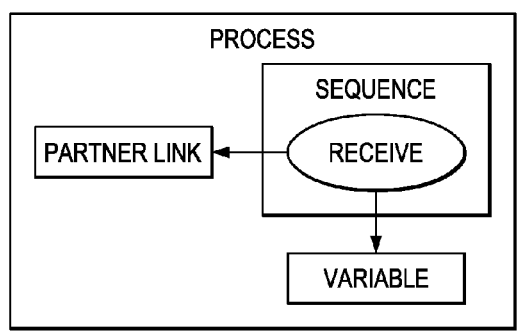
FIG. 4(c) is a diagram illustrating an embodiment of a process designed by a user.

Thus, in this embodiment, the predictive system 411 infers and predicts based on how closely a deconstructed process pattern stored in its HTM matches a WS-BPEL process being designed, or vice versa. In the present embodiment, the deconstructed process pattern is based on a topology. The HTMs are thus created for each process topology. This means that there are HTMs for a single activity WS-BPEL process, a single activity contained in a sequence activity, and so forth. FIG. 4(j) illustrates this process where the node with a pattern most similar to that of the input data is accessed and/or activated.

In another embodiment, the input data may be based on SCA 1.1. Thus, the predictive system 611 illustrated in FIGS. 6(a)-6(b) predicts a next step or operations for designing an application based on the SCA 1.1. In this embodiment, HTMs 601 store deconstructed SCA 1.1 composite as patterns. The predictive system infers based on how closely the stored deconstructed composite pattern match the SCA 1.1 composite being designed, or vice versa.

Figure 6A:
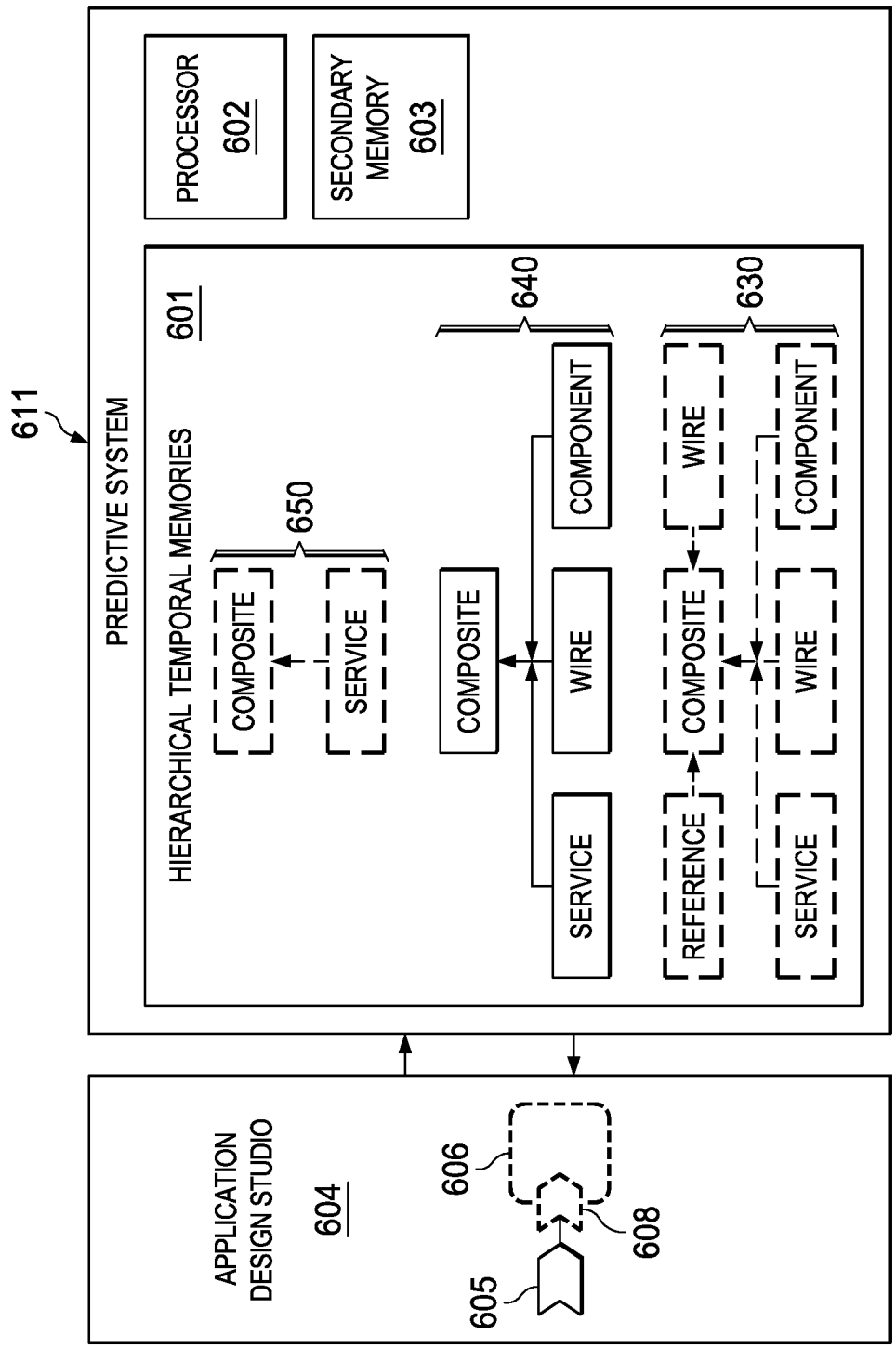
FIGS. 6(a)-6(b) are schematic diagrams illustrating embodiments of a predictive system for designing applications based on model topologies.

In the predictive design system shown in FIG. 6(a), a user may select a service 605, which is fed into the predictive system 611. Data of the service 605 is fed into the predictive system 611, where a node 640 is access and activated. The accessed and activated nodes (e.g. node 640 in FIG. 6(a)) are represented with bold lines while non-activated nodes (e.g. nodes 630, 650 in FIG. 6(a)) are represented with dotted lines.

Figure 6B:
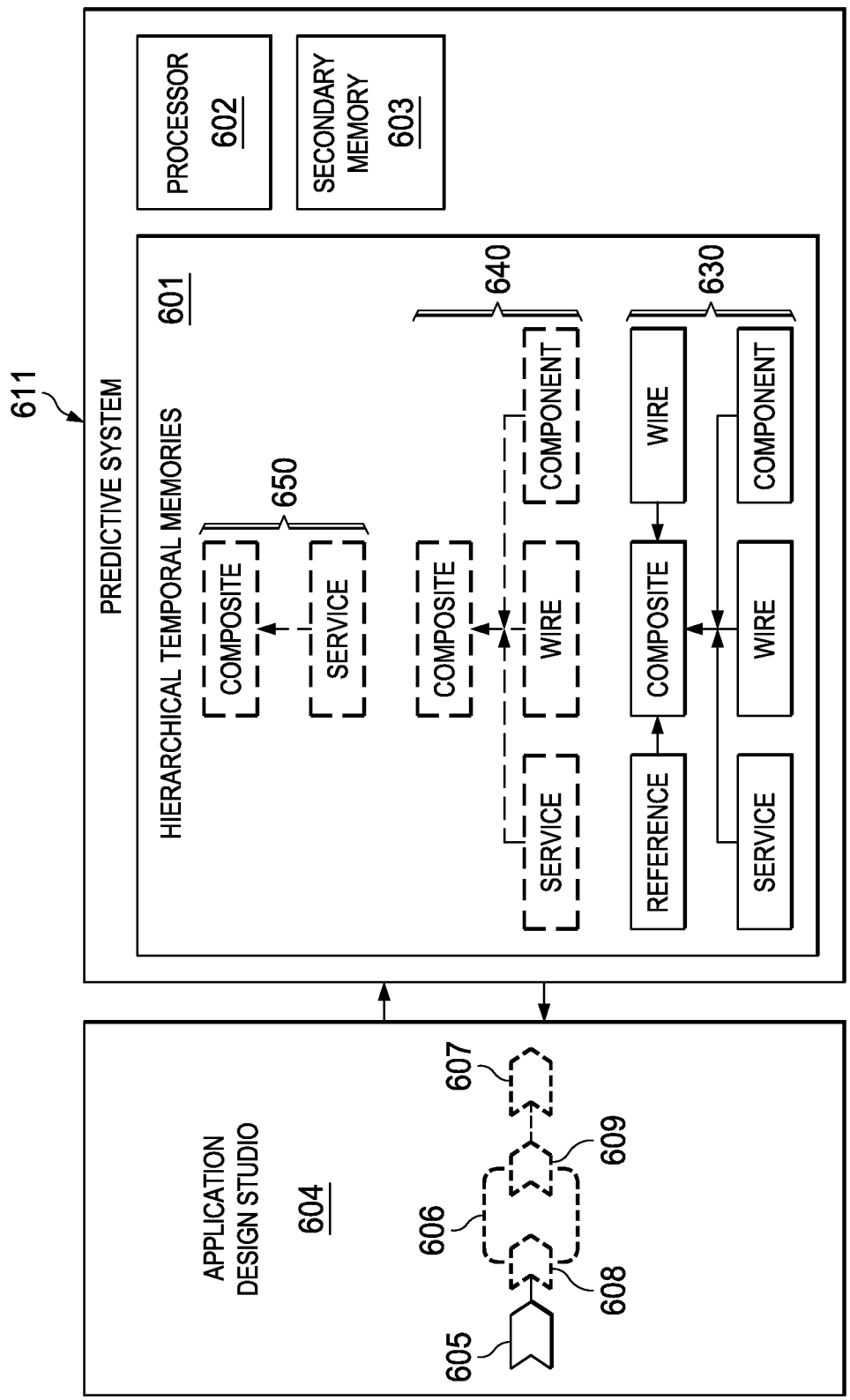

The predictive system 611 then predicts a next task, which may be a service, a component, a wire, or other appropriate tasks, which are presented to the user. In other embodiments, as illustrated in FIG. 6(b), the predictive system 611 may even make a longer sequential prediction by predicting next tasks, which may be a service, a wire, a component, a reference, or other appropriate tasks. The predictive system 611 makes predictions based on the input data and prior data that its memory nodes have stored. More information on how the predictive system makes predictions based on SCA 1.1 is provided in Section VI. Predictive Application Deployment.

HTMs based on process patterns or process component patterns alternatively provide effective ways of predicting application designs.

B. Based on Process Patterns

Another embodiment of the predictive system may use process patterns for predicting application designs. In an embodiment, the process patterns are based on WS-BPEL 2.0. FIG. 4(c) illustrates an example of a process designed by a user. The process involves a single "receive" activity where a message is received on a partner link. Serialized WS-BPEL 2.0 process that corresponds to FIG. 4(c) would look substantially similar to the following.

```
<bpel:process>
  <bpel:partnerLink name="myPartnerLink"
  partnerLinkType="mywsdl:myPartnerLinkType"/>
  <bpel:variable name="myVariable" messageType="mywsdl:input">
  <bpel:sequence>
    <bpel:receive partnerLink="myPartnerLink" name="receive"
      variable="myVariable" operation="mywsdl:operation"/>
  </bpel:sequence>
</bpel:process>
```

Figure 4D:
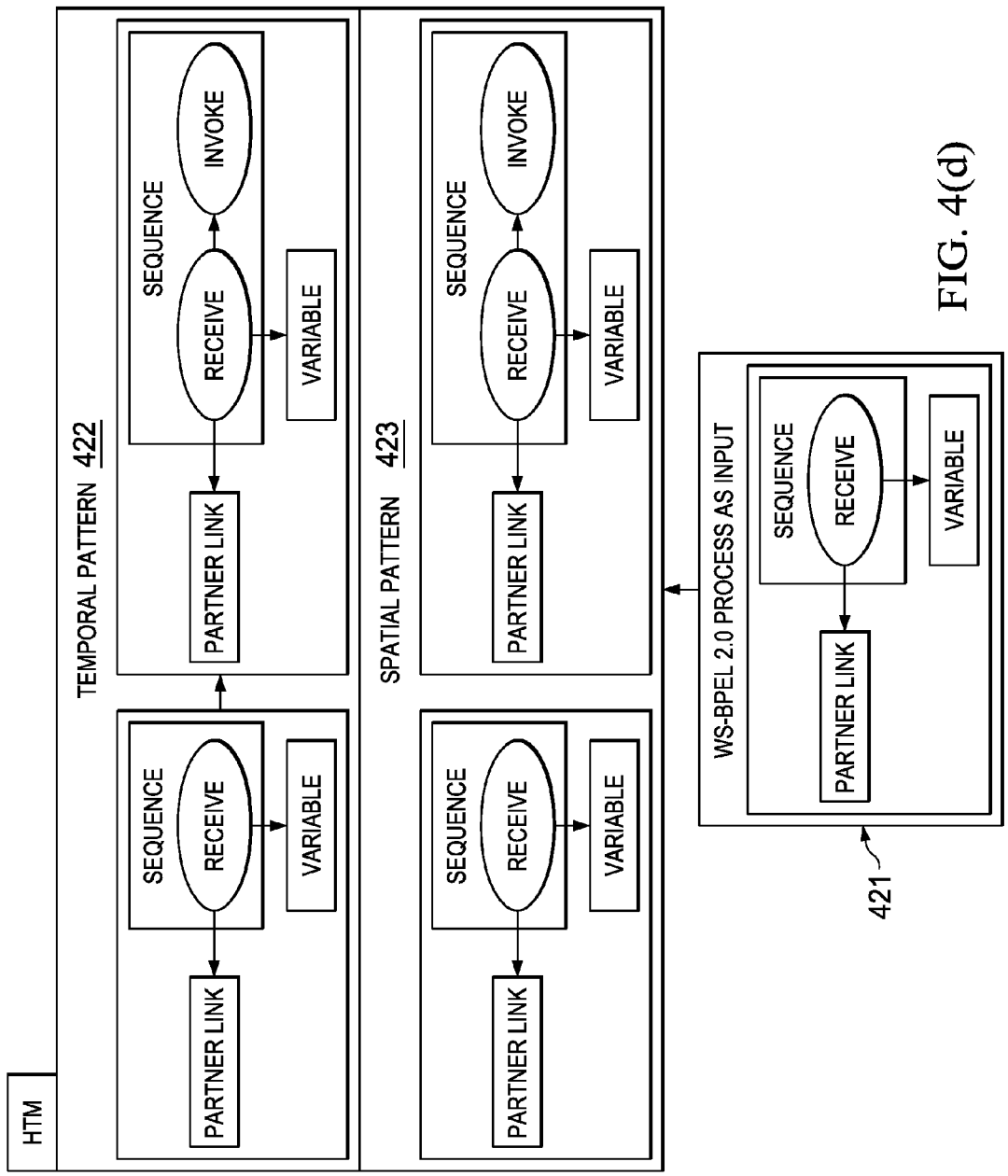
FIG. 4(d) is a diagram illustrating an embodiment of an HTM receiving a process as an input.
Figure 4E:
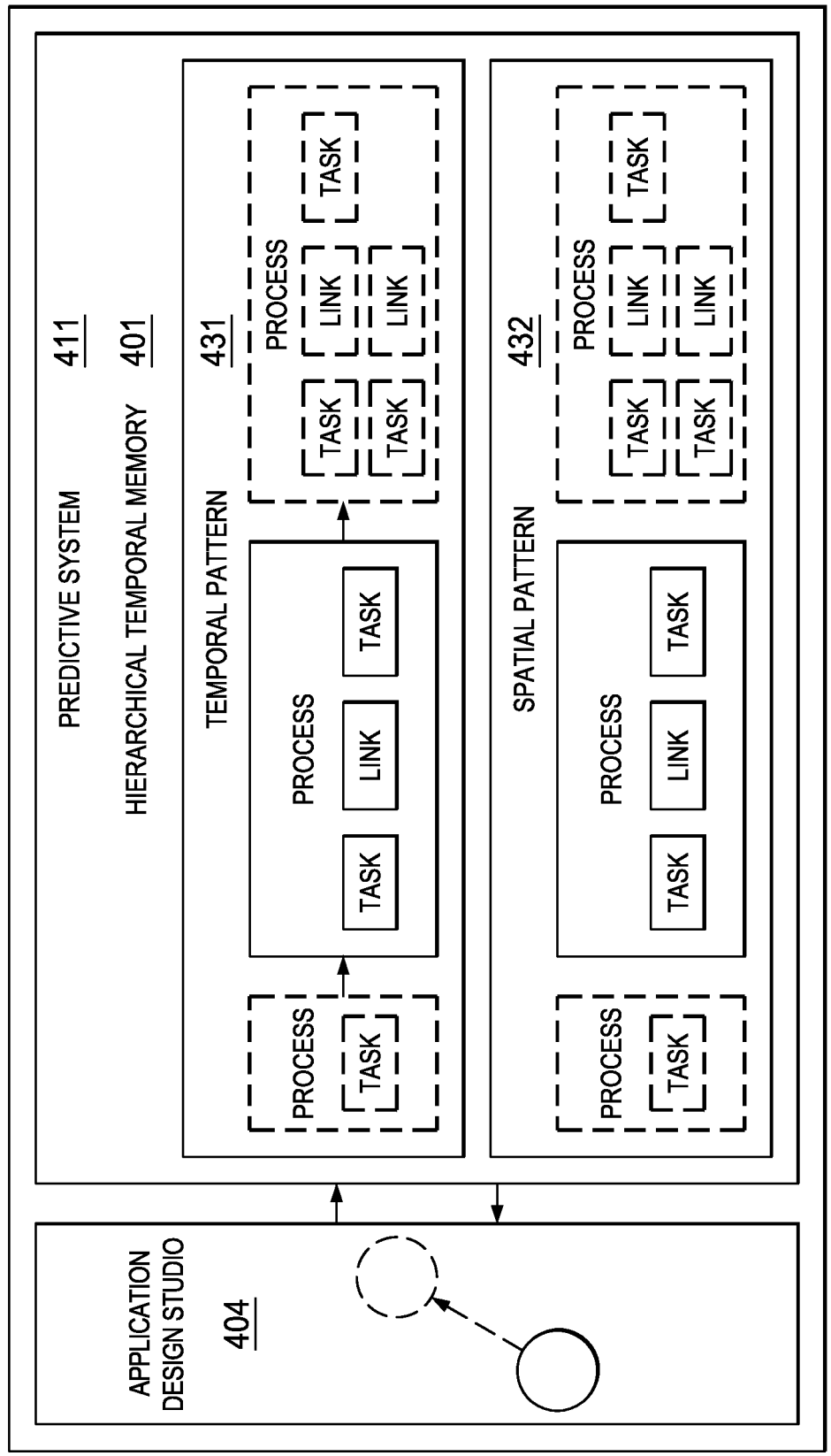
FIGS. 4(e)-4(f) are schematic diagrams illustrating embodiments of a predictive system for designing applications based on process patterns.
Figure 4F:
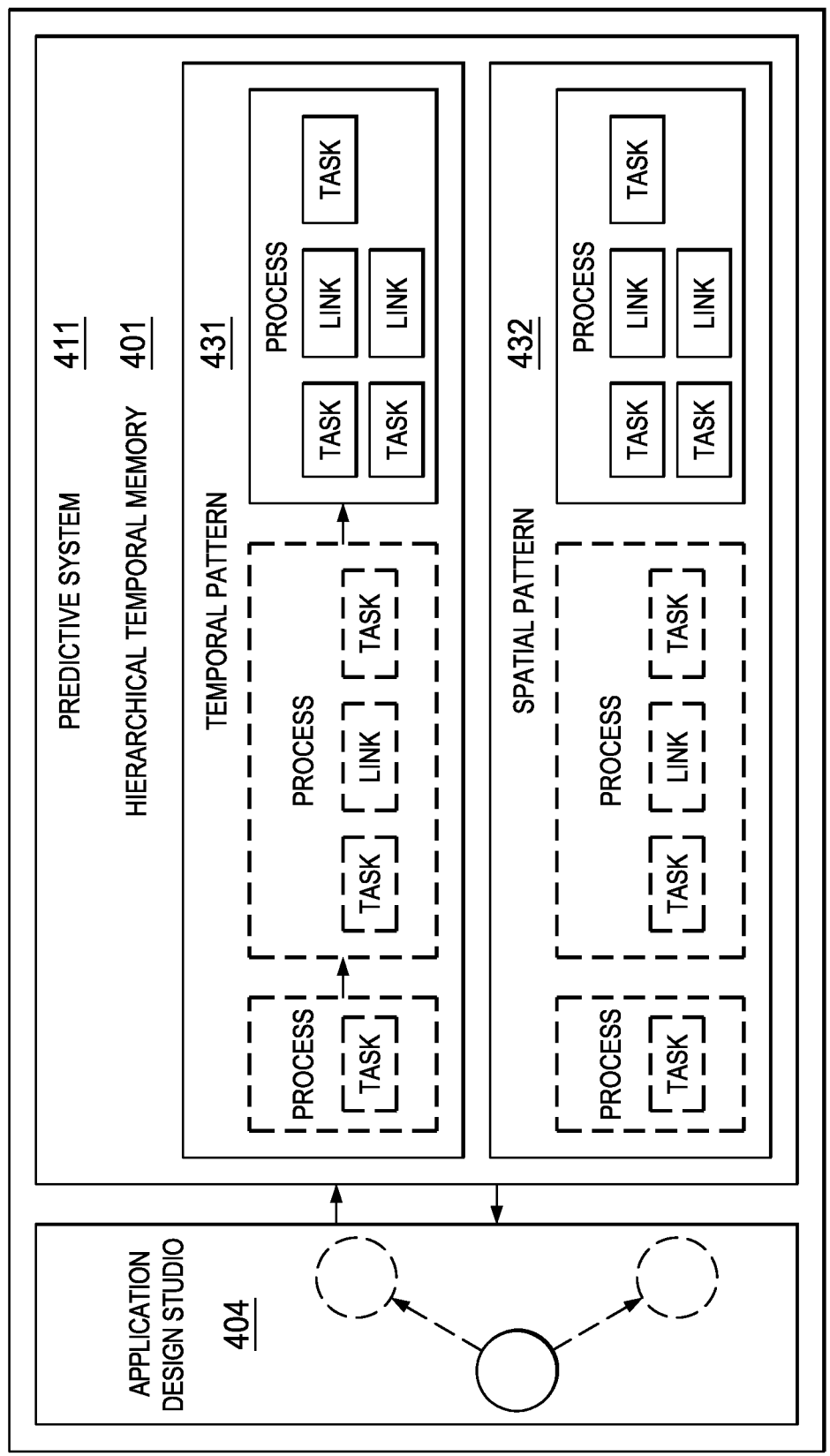

FIG. 4(d) illustrates a process where a WS-BPEL 2.0 process 421 is fed into the HTM as input. The HTM includes a space for temporal pattern 422 and a space for spatial pattern 423. FIGS. 4(e)-4(f) illustrate an embodiment of a user interface 404 interacting with the predictive system 411 that uses process models for designing applications. In an embodiment, the space for temporal pattern is substantially the same as the temporal memory space and the space for spatial pattern is substantially the same as the spatial memory space. Based on the aforementioned WS-BPEL 2.0 process as input, the predictive system 411 can predict the next sequence of steps a user or process designer can or desires to take for completing the process. In this embodiment, the predictive system 411 makes these predictions by activating HTM nodes that most closely match this particular process pattern. Thus, the predictions are based on HTMs 401 that store the process patterns.

Patterns of previously designed models employing WS-BPEL 2.0 process patterns are stored in the HTMs 401. Here, patterns can be spatial patterns or temporal patterns. Spatial patterns 423 are intermediate instances of the process model as it is getting built. Temporal patterns 422 are sequences in which the process was built. Thus, an embodiment of the predictive system 411 makes an inference based on how closely the stored process pattern matches the WS-BPEL process being designed. In another embodiment, the inference is based on how closely the WS-BPEL process being designed matches the stored process pattern. While FIGS. 4(e)-4(f) do not display a processor or a secondary memory, these components may be present in the predictive system 411.

Figure 6C:
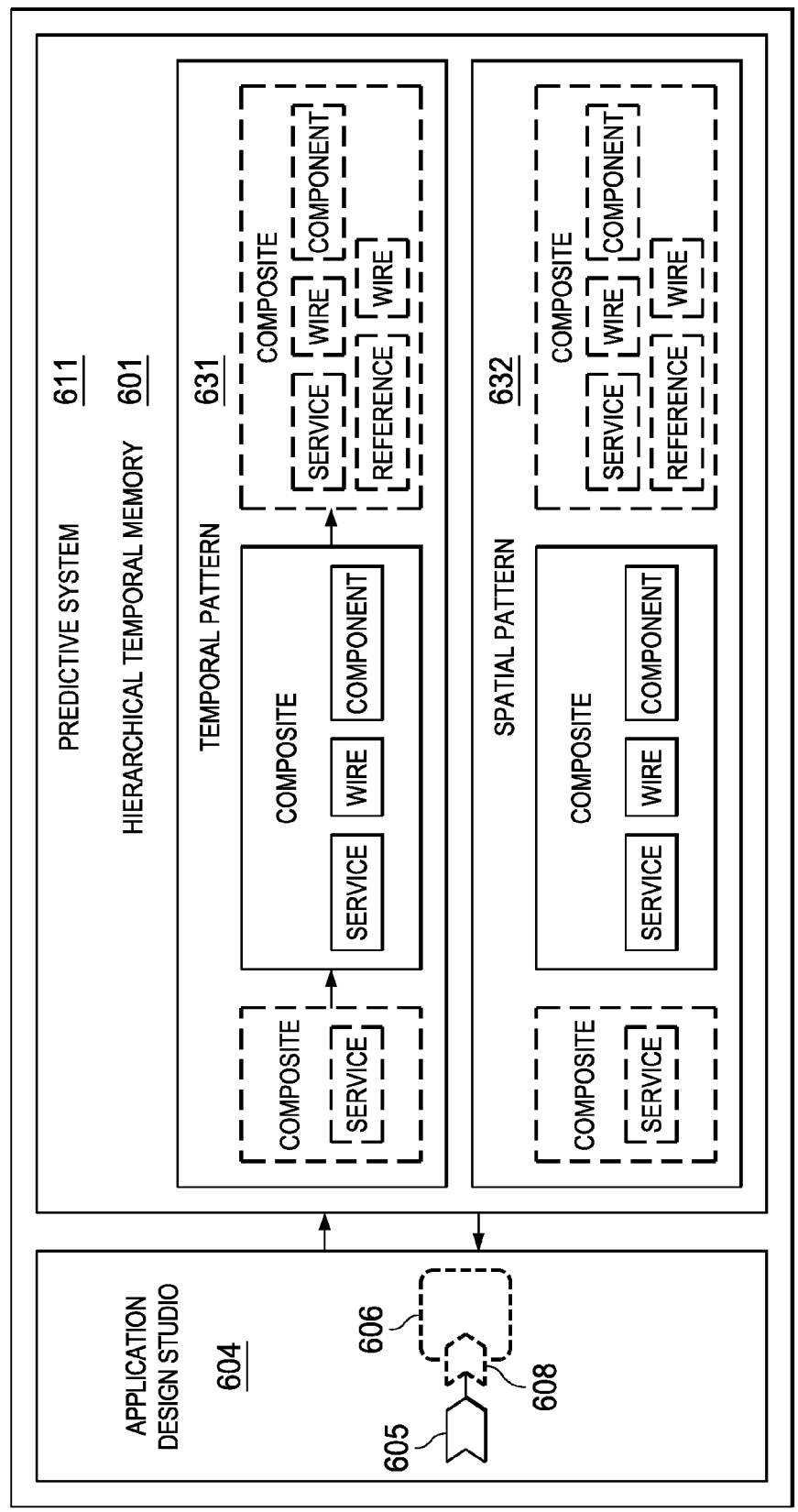
FIG. 6(c) is a schematic diagram illustrating an embodiment of a predictive system for designing applications based on composite models.

In another embodiment, the predictive system may infer for input based on SCA 1.1. In this case, an SCA 1.1 composite pattern illustrated in FIG. 6(E) may be fed into the HTM of the predictive system. As shown in FIG. 6(c), the predictive system 611 may thus predict next steps or operations based on the SCA 1.1 composite pattern as input data. More information on how the predictive system makes predictions based on SCA 1.1 is provided in Section VI. Predictive Application Deployment.

C. Based on Process Component Patterns

Figure 4G:
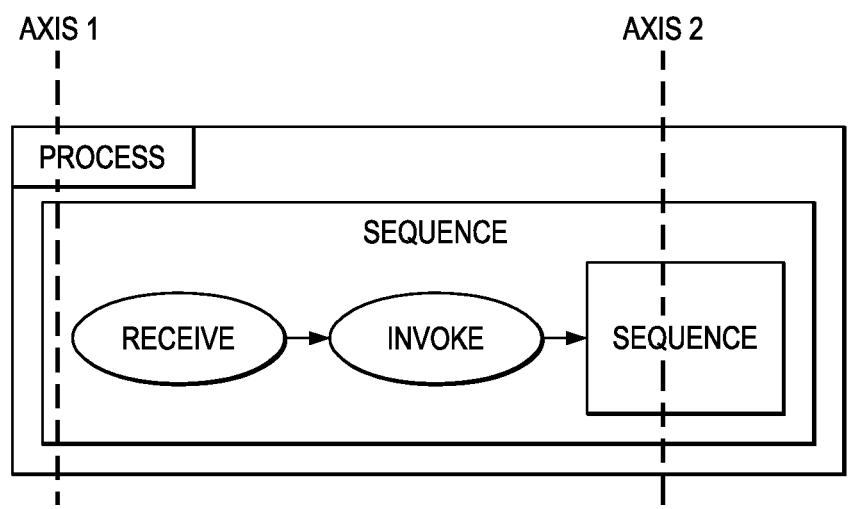
FIG. 4(g) is a diagram illustrating an embodiment of a process component with axes.
Figure 4H:
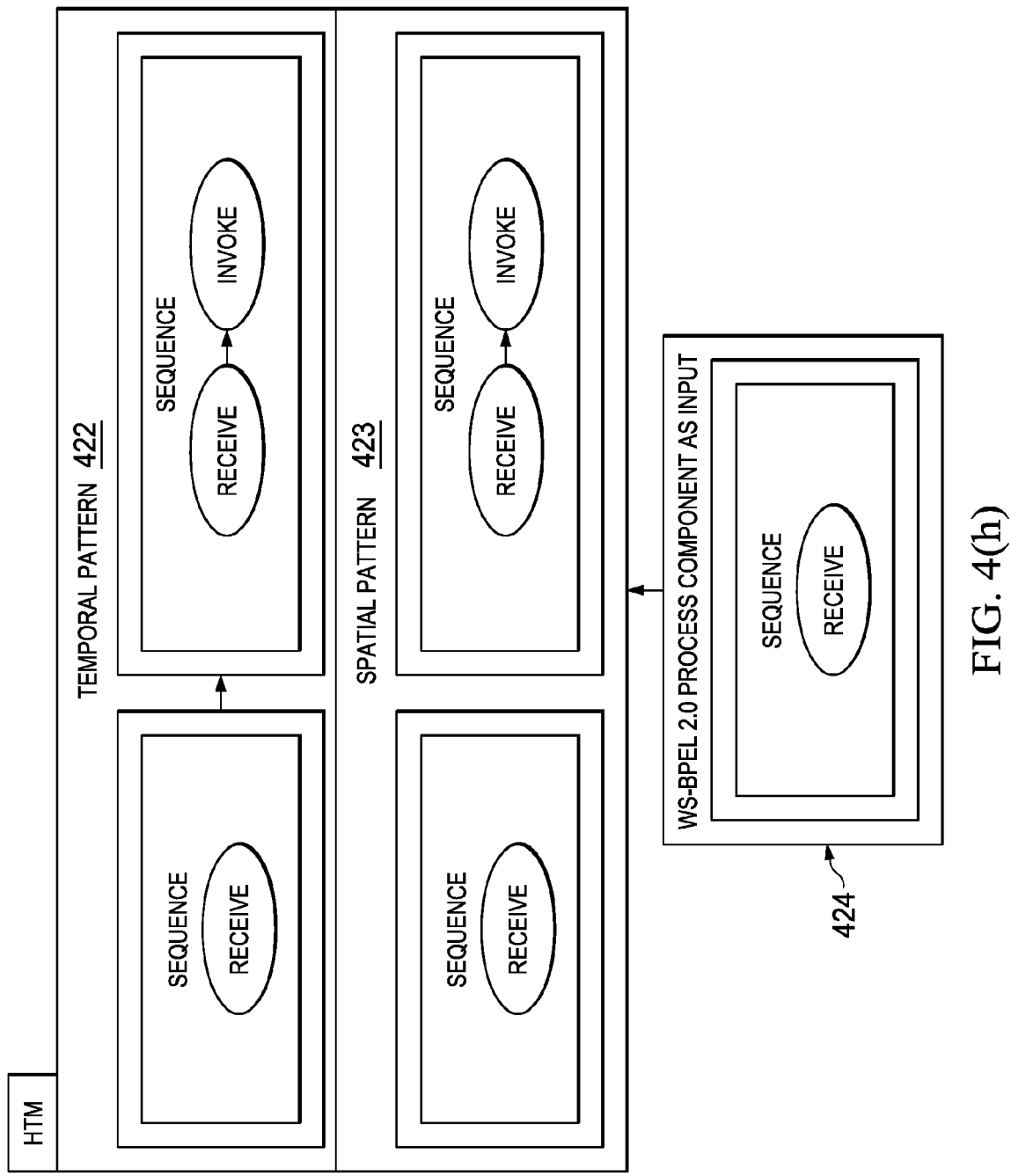
FIG. 4(h) is a diagram illustrating an embodiment of an HTM receiving a process component as an input.
Figure 4I:
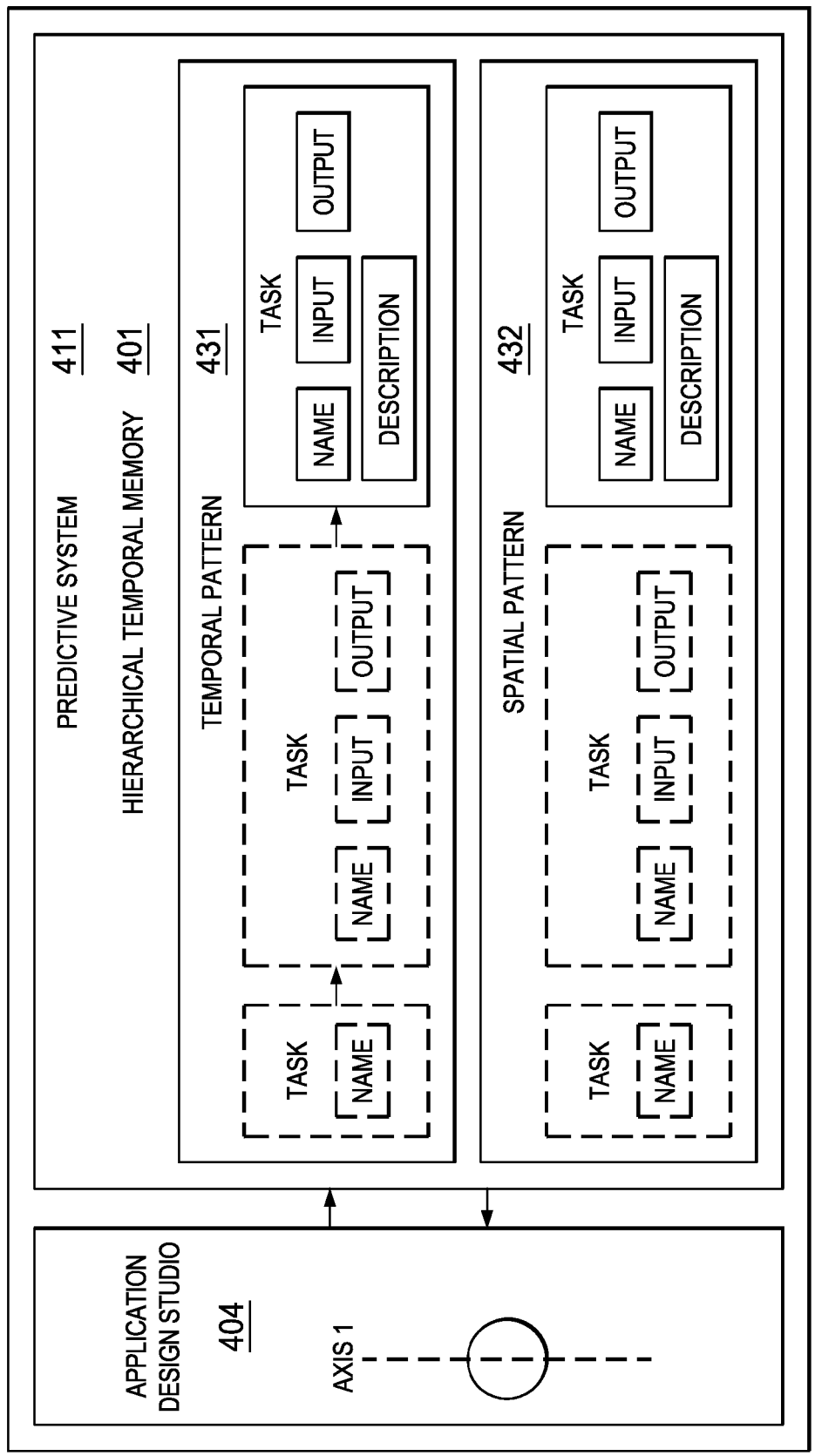
FIG. 4(i) is a schematic diagram illustrating an embodiment of a predictive system for designing applications based on process components.
Figure 4J:
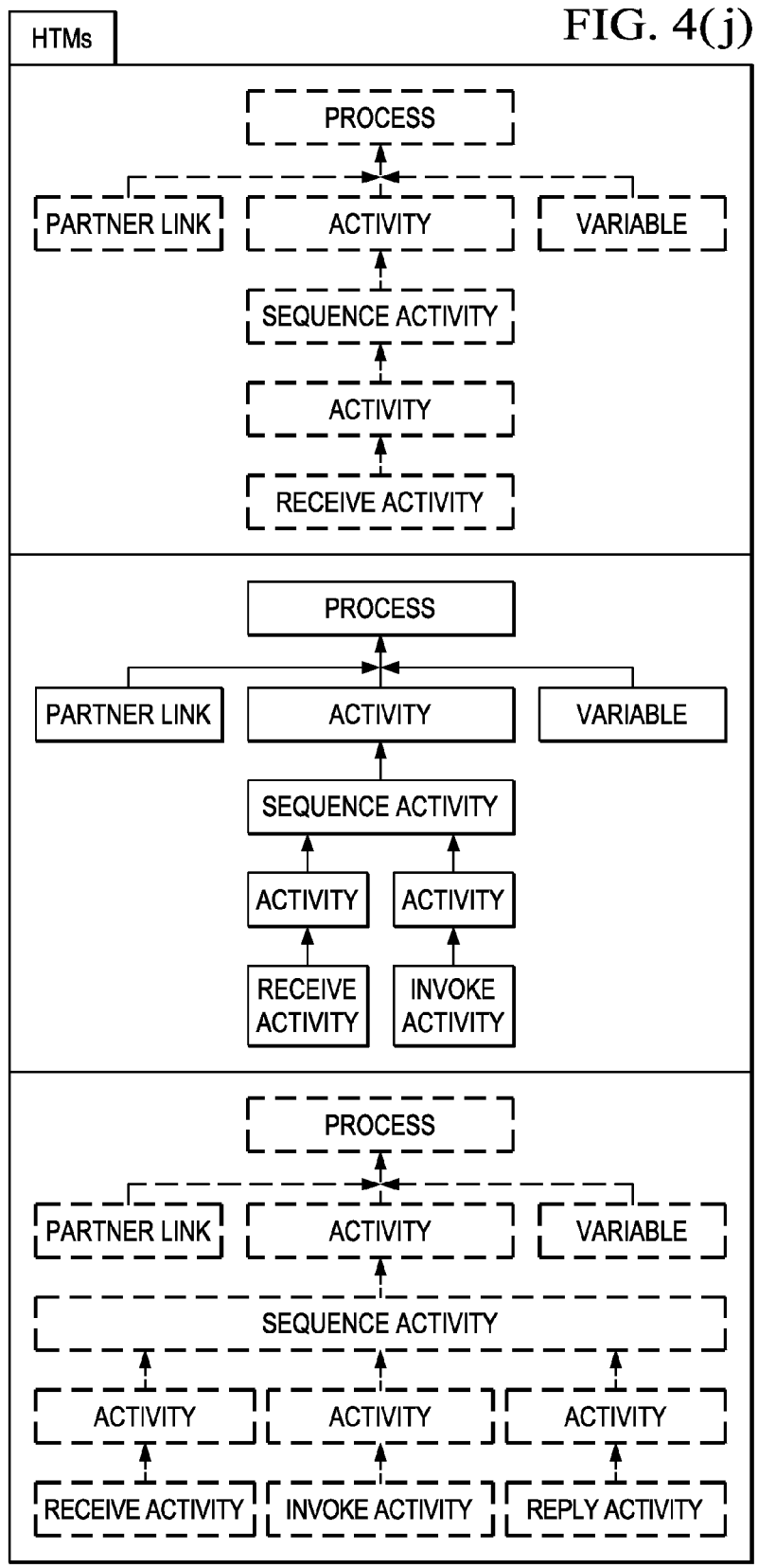
FIG. 4(j) is a diagram illustrating an embodiment of an HTM where a node is activated.

In another embodiment, the HTMs store WS-BPEL 2.0 process component patterns for process model axes. In an embodiment, the axis is a particular location or instance of the process pattern. Thus, a process component pattern is more specific than the process pattern. In an embodiment, predictions are thus made in a more specific manner. FIG. 4(i) illustrates an embodiment of a user interface 404 interacting with the predictive system 411 that uses process model component axes for designing applications. FIG. 4(g) illustrates an example embodiment of a process component with axes. FIG. 4(h) illustrates an embodiment of an HTM that receives a WS-BPEL 2.0 process component 424 as input. Previously designed model component is stored as a pattern for each model axis (for each model component creation step). Spatial patterns are intermediate instances of the process model component as it is getting built. Temporal patterns are sequences in which the process component was built. Thus, an embodiment of the predictive system 411 infers based on how closely the stored process component pattern matches the WS-BPEL process component being designed, or vice versa. Memories are generated for each process component based on its location or axis in the process model. For example, a sequence activity on the first axis has a set of HTMs for each sequence activity ever designed for this axis. The next axis has a set of HTMs for each sequence activity ever designed for this axis, and so forth. While FIG. 4(i) does not display a processor or a secondary memory, these components may be present in the predictive system 411.

Figure 6D:
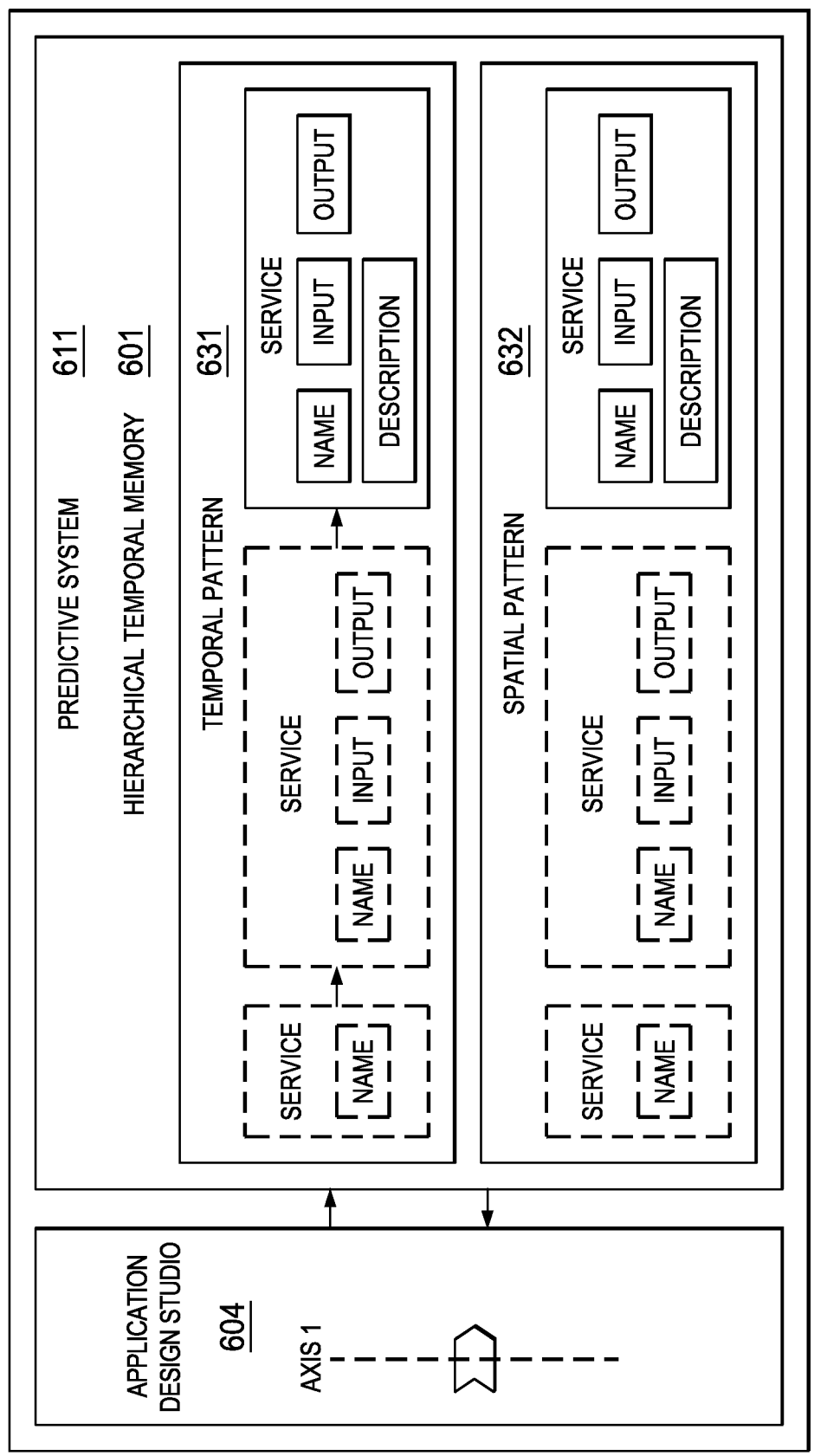
FIG. 6(d) is a schematic diagram illustrating an embodiment of a predictive system for designing applications based on composite model components.

In another embodiment, the HTMs store SCA 1.1 composite component patterns for model axes. Thus, the input data is based on SCA 1.1 composite components. FIG. 6(d) illustrates the predictive system 611 making design predictions using SCA 1.1 composite components for each axis as input. More information on how the predictive system makes predictions based on SCA 1.1 is provided in Section VI. Predictive Application Deployment.

V. HTMs for Predictive Application Design

Figure 5:
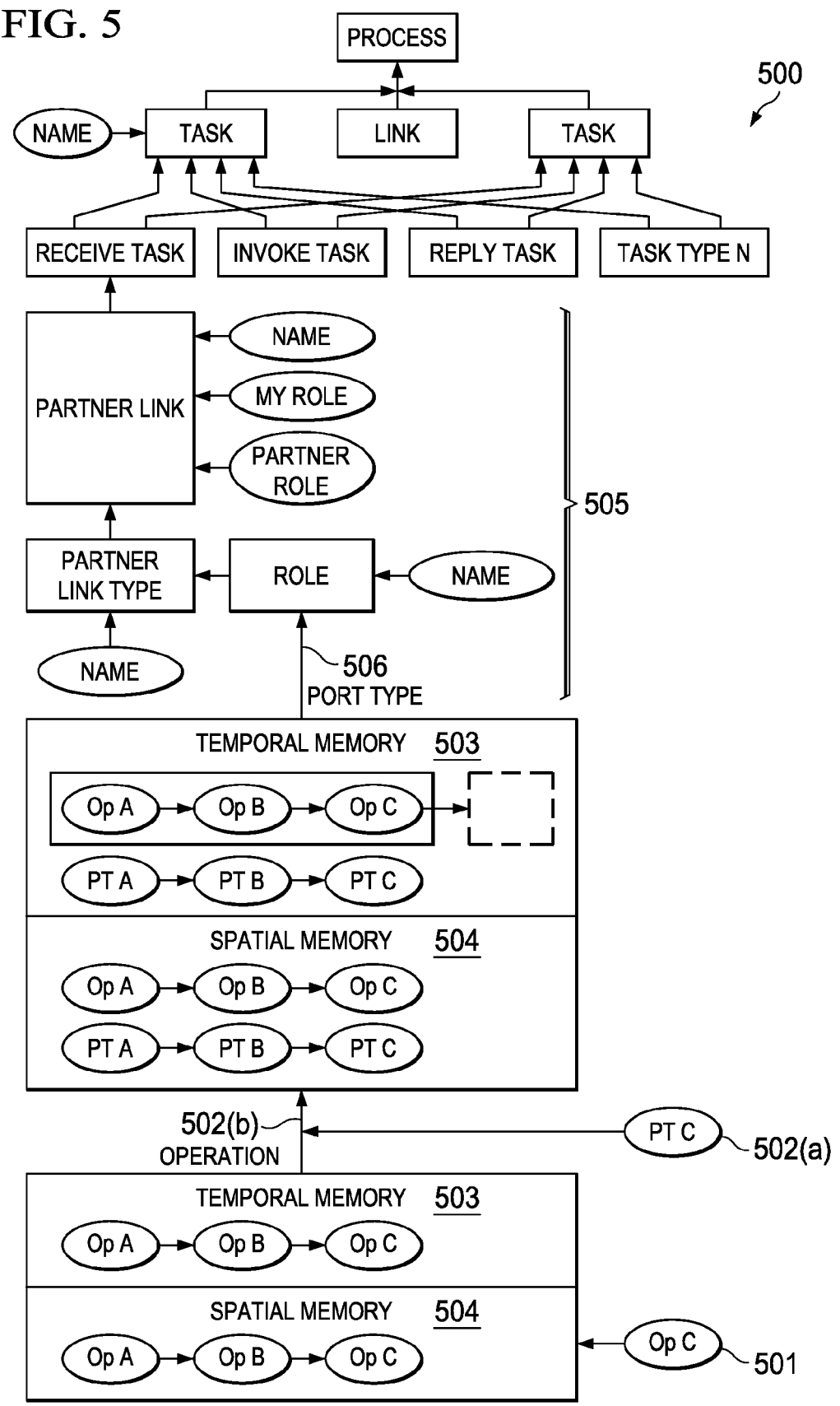
FIG. 5 is a schematic diagram illustrating an embodiment of an HTM structure used for a predictive system for designing applications.

FIG. 5 illustrates an embodiment of an overall HTM structure 500 for the predictive system 311 for designing WS-BPEL 2.0-based business processes using the application design studio. While this embodiment employs an HTM structure focusing on predictions based on topologies, other embodiments may employ substantially similar HTM structures for predictions based on process patterns or process component patterns. The HTM structure 500 has a substantially similar hierarchy to that of a model defining the WS-BPEL-2.0 based business process, and in this embodiment, the HTM is employed to predict a configuration of two tasks and a link when the user designs the process as shown in FIGS. 4(a)-4(b). While this embodiment illustrates designing WS-BPEL 2.0-based business processes, the predictive system 411 may be used for designing business processes that are based on other executable languages. FIG. 7 illustrates using SCA 1.1 to make design predictions. More information on SCA 1.1 is provided in Section VI. Predictive Application Deployment.

The HTM structure 500 includes a hierarchy of levels having memory nodes depicted as rectangles that receive input data depicted as ovals. While each memory node includes a temporal memory space 503 and a spatial memory space 504, they are not depicted for every memory node in FIG. 5 in order to provide a higher level view of the HTM structure 500. As illustrated, inputs may be fed into the memory nodes in a multi-hierarchical manner at levels 501, 502(a), (b), 505, and 506. Input data is transmitted by a user via a user interface accessing the predictive system as illustrated in FIG. 3. The memory nodes identify combinations of the inputs often received as causes and store the causes in the spatial memory 504. The memory nodes further identify sequential combinations of the inputs often received as temporal groups and store the temporal groups in the temporal memory 503. Based on the causes and the temporal groups stored in the memory nodes, the memory nodes are operable to generate predictions with probabilities, where the predictions with the highest probabilities are passed as beliefs on to a next higher level of memory nodes in the HTM structure 500 as inputs. In an embodiment, a user may load the HTM structure 500 with initial causes and temporal groups so that it can begin inferring when new input data is fed into its nodes.

In the present embodiment, an input "Op C" 501 enters a memory node at the lowest level of the HTM structure 500, which generates probability information on whether one or more of the inputs are associated with one or more of the causes and with one or more of the temporal groups. The memory node generates a belief 502(b) based on the probability information, which is then fed into a memory node at a next higher level along with an input "PT C" 502(a).

The memory node at the next higher level then compares the belief 502(b) and the input "PT C" 502(a) with its stored causes and temporal groups to generate its predictions with probabilities and to form its belief 506. This belief-generating behavior is performed by all the memory nodes. The HTM structure 500 outputs a pre-specified number of beliefs as options for next sequences of actions to a user. The pre-specified number of beliefs are generated based on the probability information generated by the memory nodes, wherein the next sequences of actions are beliefs that are the matched causes and temporal groups with the highest probabilities at a highest level of the HTM structure 500. In this embodiment, inputs may be Name, My Role, Partner Role, Op A, Op B, Op C, PT A, PT B, and PT C. These are possible inputs for designing an application. But there may be other embodiments of inputs. The memory nodes may be used for different purposes and labeled accordingly, such as Role, Partner Link Type, Partner Link, Receive Task, Invoke Task, Reply Task, Task Type N, Task, Link, and Process. There may be other embodiments of labels.

VI. Predictive Application Deployment

An embodiment of the predictive system shown in FIG. 3 may be employed more specifically for predictive application deployment. The predictive system 311 may predict a runtime configuration of an enterprise application as a series of configuration creation/setting steps, wherein the configuration creation steps can be inferred from the deployment artifacts. Furthermore, enterprise application runtime configurations are often, if not always, hierarchical. This is why HTMs or HMMMs are effective data structures for representing predictions of such configurations.

In an embodiment, the predictive system 311 can predict the runtime deployment configuration of SCA 1.1 composite, where the predictive system 311 makes inferences about next runtime deployment configuration detail or step based on HTMs 301. The predictive system 311 is capable of predicting deployment configurations based on previously used configurations and/or other relevant historical data. An application configuration may be mapped into the HTM 301 that has levels substantially similar to the hierarchy of the configuration that defines the application.

In the present embodiment, each memory node of the HTM 301 in the predictive system 311 has spatial and temporal memory spaces that store combinations of inputs as causes and sequential combinations of inputs as temporal groups, respectively. Thus, when input data, in an embodiment, a particular service, wire, and/or component are fed into a memory node, the memory node compares the input data with its stored causes and temporal groups, and the HTM 301 outputs a belief on what the next deployment configuration task or element should be. In an embodiment, the predictive system may simultaneously predict a number of configuration tasks or elements. The belief at the highest level of the hierarchy of the HTM 301 will be presented to the user as a next step for deploying an enterprise application. In an embodiment, a user may load the HTM 301 with initial causes and temporal groups so that it can begin inferring when new input data is fed into its nodes. The predictive system 311 performs these functions by having the memory 303 that stores computer instructions for carrying out the described methods and the processor 302 that actually executes the computer instructions. The predictive system 311 may be accessed by an end user employing the application management system via a cloud system or a local network (as discussed above in relation to FIG. 3). This allows accessibility for users located anywhere around the globe that has access to internet. The predictive system 311 thereby predicts by closely modeling the human brain function. Since predictions on deployment configurations are made on similarly deployed applications, users are provided with an optimal way for configuring an application without requiring expert-level knowledge of a particular enterprise application domain. The system is thus able to act as a trainer for inexperienced users.

In this embodiment, an HTM is employed, but other embodiments may employ an HHMM structure or other suitable models. In this embodiment, the inferencing or predicting may be done using three main different methods. It may be based on a model topology, composite models or patterns, or composite component models or patterns for axes.

A. Based on Model Topology

Figure 6E:
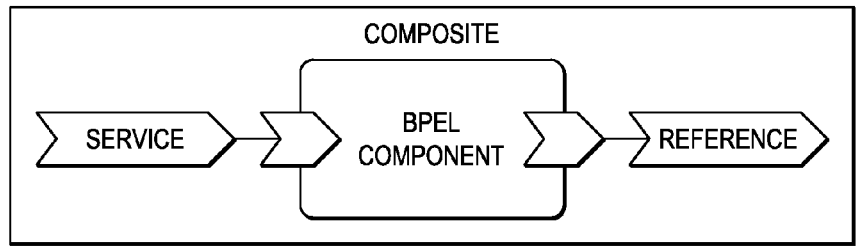
FIG. 6(e) is a diagram illustrating an example composite designed by a user.
Figure 6F:
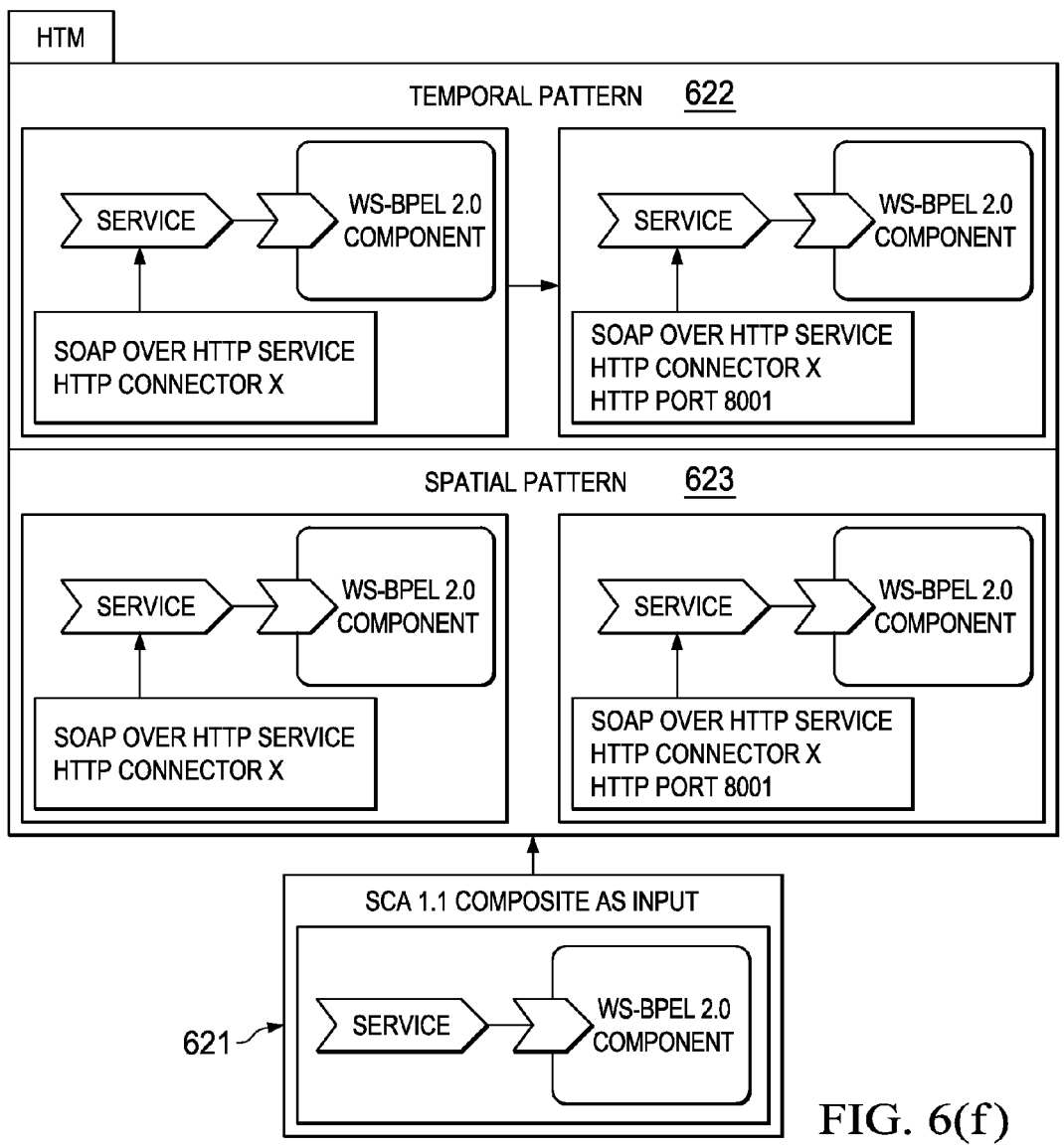
FIG. 6(f) is a diagram illustrating an embodiment of an HTM receiving a SCA 1.1 composite as an input.
Figure 6G:
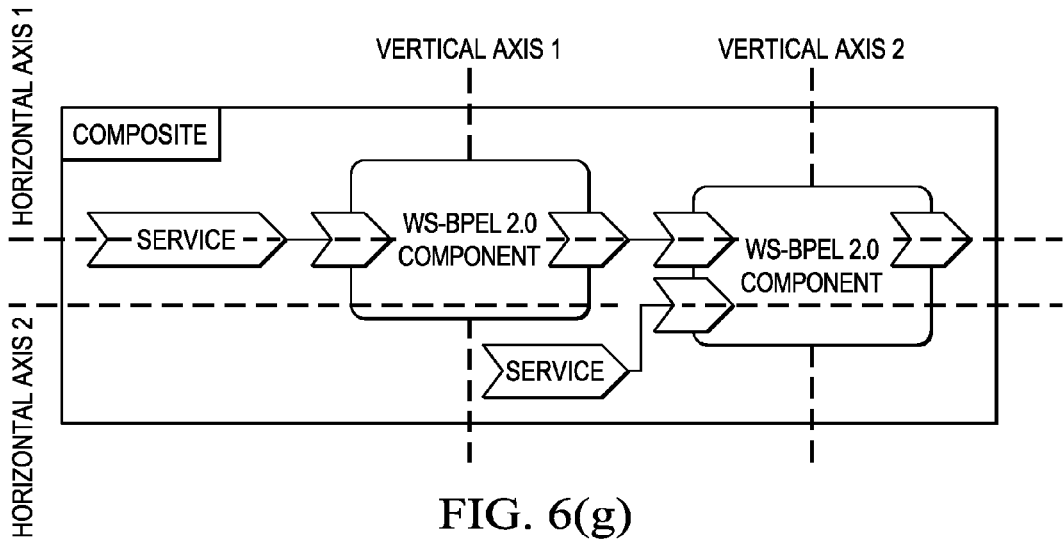
FIG. 6(*g*) is a diagram illustrating an embodiment of a composite component with axes.
Figure 6H:
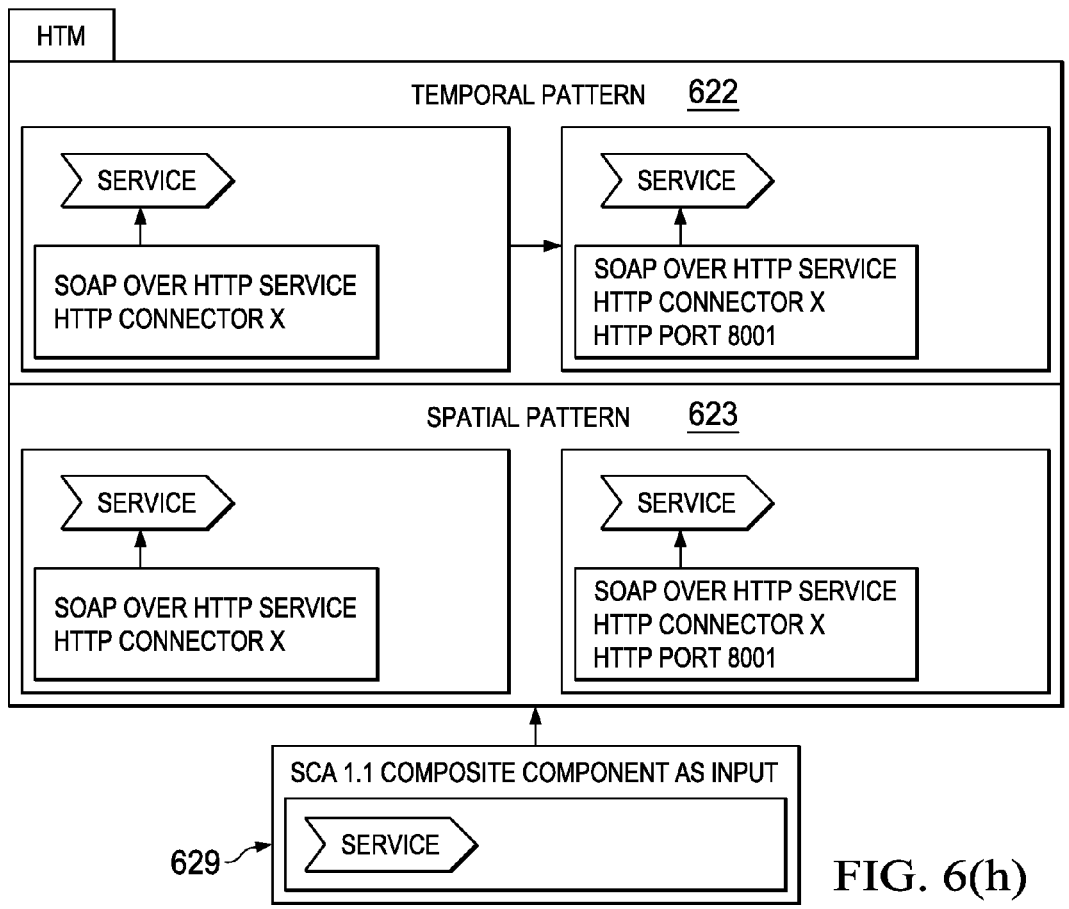
Figure 6I:
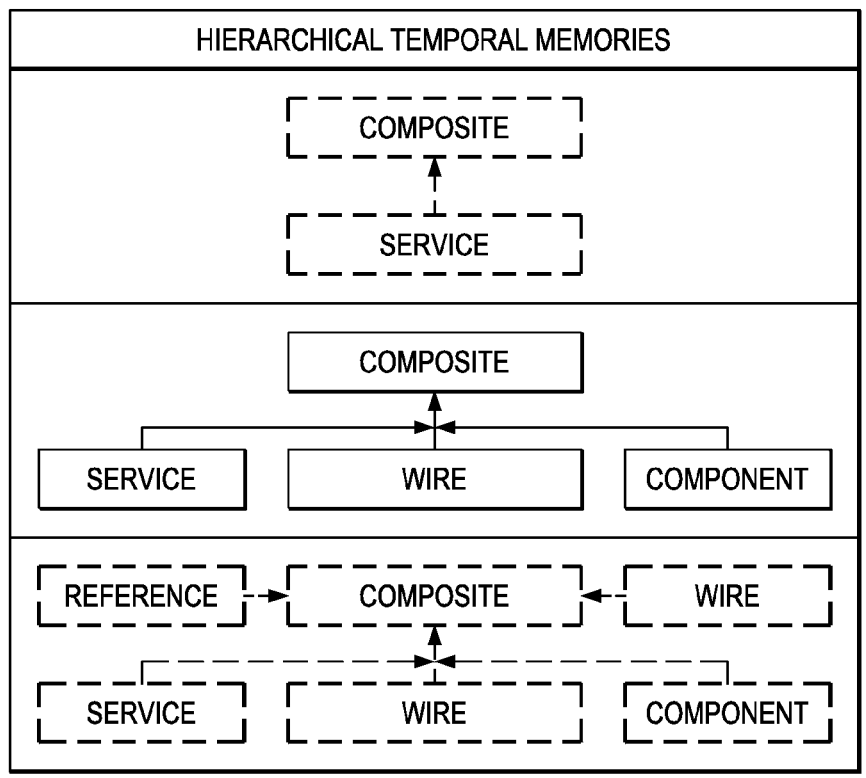

In an embodiment, HTMs store deconstructed SCA 1.1 composite as patterns as illustrated in FIG. 6(i). The predictive system infers based on how closely the stored deconstructed composite pattern matches the SCA 1.1 composite being configured. Thus, in this embodiment, predictions on the configuration of an enterprise application are made based on matching the topology of the application being deployed. In this case, the predictive system provides the user with predictions for the service and process component runtime configurations, and these predictions may continue until the deployment process is complete.

In this embodiment, HTMs are created for each composite topology, and there are thus HTMs for a single service, component, wire, and so forth. The predictive system therefore predicts on the configuration of the applications of all permutations and combinations of matching topology of the application at hand. Each of the topology has an equivalent HTM. The HTM that most closely matches the deconstructed composite pattern gets activated and accessed for providing the prediction.

In an embodiment, the runtime environment may be an enterprise server. A multi-level hierarchy may be defined, a top level consisting of the application runtime deployment configuration and a bottom level consisting of application runtime deployment configuration components. Here, the application runtime deployment configuration component is part of the application runtime deployment configuration. Table 2 shows examples of configuration components in case of BPEL component-based composition application.

TABLE 2

| Model Component | Runtime Deployment Configuration Model |
|---|---|
| SOAP over HTTP Service | Configure SOAP over HTTP Service Binding |

TABLE 2-continued

| Model Component | Runtime Deployment Configuration Model |
| --- | --- |
| BPEL Component | Configure BPEL component properties |
| SOAP over HTTP Reference | Configure SOAP over HTTP Reference Binding |

Figure 9:
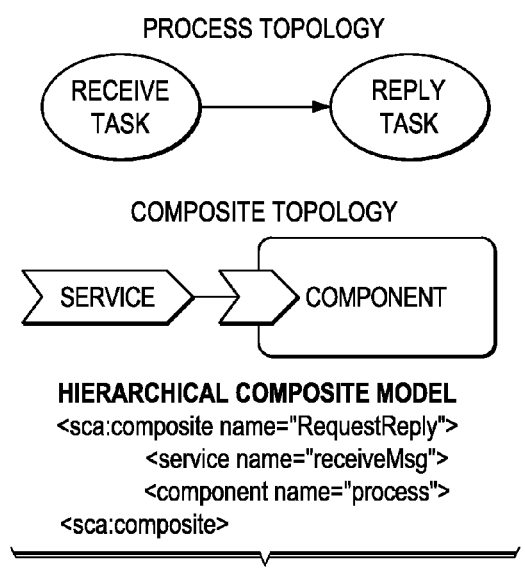
FIG. 9 illustrates a process topology, composite topology, and a hierarchical composite model.

The composite application is a collection of configuration components. In an example, consider two application configurations: (1) a service that receives a message, a component processes it and sends back a reply; (2) a service that receives a message, a component processes it, invokes a reference, and sends back a reply. The structure of these processes are illustrated in FIG. 9. A user configuring a composite that receives a message, processes it, and replies back will first configure the service it is receiving the message on. Thus, the application configuration or the process configuration is a collection of configuration actions. This application configuration is mapped on to an HTM that has substantially the same levels as the hierarchy of the configuration that defines the application.

B. Based on Composite Model

FIG. 6(e) illustrates an example composite designed by a user, wherein the composite comprises a service, component, and reference. SCA 1.1 composite for this example would be substantially similar to the following:

```
<sca:composite name="RequestReply">
    <service name="receiveMsg">
    <component name="process">
    <reference name="sendMsg">
<sca:composite>
```

Based on the aforementioned SCA 1.1 composite as input data, an embodiment of the predictive system may predict the next sequence of steps a composite application deployment engineer may take in order to complete the composite application configuration. The predictive system will make these predictions by activating the HTMs that closely match this particular composite pattern. FIG. 6(f) illustrates an example of how an SOAP Over HTTP Service is configured for HTTP. SCA 1.1 Composite 621 is fed into an HTM as input. The HTM comprises a space for temporal pattern 622 and a space for spatial pattern 623.

The HTMs store SCA 1.1 composite as patterns. Spatial patterns are intermediate instances of the composite as it is being configured for deployment, and temporal patterns are a sequence in which the composite was configured. Inferences are made by the predictive system based on how closely the stored composite patterns match the SCA composite being configured.

C. Based on Composite Model Components

In an embodiment, HTMs store SCA 1.1 composite component for each composite model axes as patterns. Once again, an axis is a specific or particular instance or location of a composite model. Thus, a composite model component may be more specific than the composite models. In an embodiment, spatial patterns are all the intermediate instances of the composite model component deployment configuration as it is being configured, and temporal patterns are sequences in which the composite component was configured for deployment. The predictive system infers based on how closely the stored composite component pattern matches the SCA composite component being configured. As illustrated in FIG. 6(g), memories are generated for each composite component based on its location or axes in the composite model, e.g., service on the first vertical and horizontal axes has a set of HTMs for each service ever designed for these axes; for the next vertical axes, there is a next set of HTMs and so forth. FIG. 6(h) illustrates an SCA 1.1 composite component 629 being fed into an HTM as input. The HTM once again has a space for temporal pattern 622 and a space for spatial pattern 623.

VII. HTM for Predictive Application Deployment

Figure 7A:
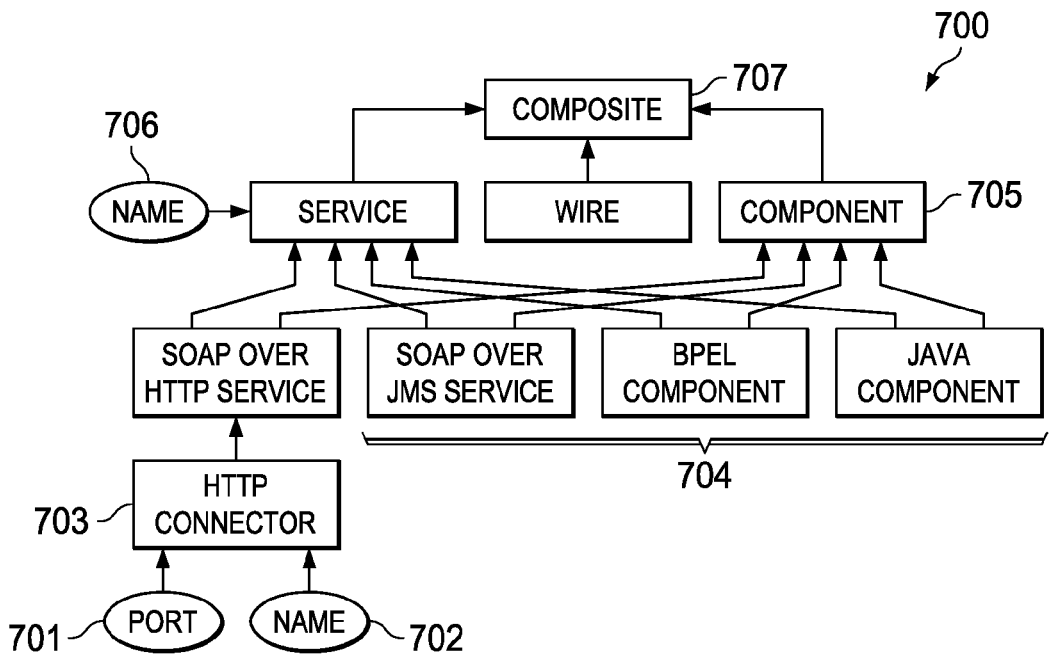
FIGS. 7(*a*)-7(*b*) are schematic diagrams illustrating an embodiment of an HTM structure used for a predictive system for deploying applications.
Figure 7B:
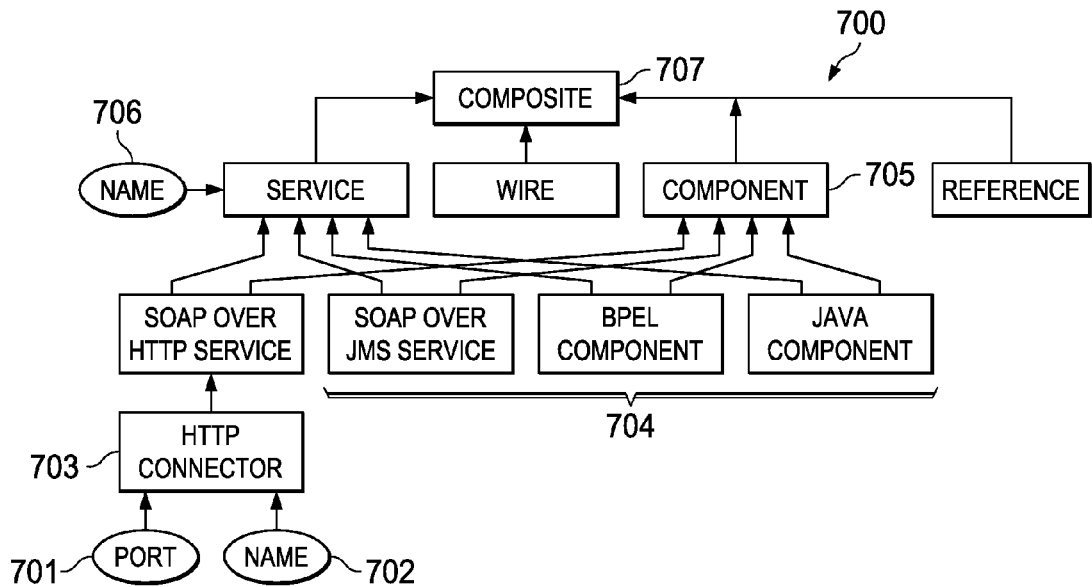

FIGS. 7(a)-7(b) illustrates embodiments of an HTM structure for a predictive system 611 for deploying enterprise applications. While this embodiment employs an HTM structure focusing on predictions based SCA 1.1, other embodiments may be based on other architecture or languages. FIG. 7(a) is more specifically an HTM for predicting service and component configurations, while FIG. 7(b) is more specifically an HTM for predicting service, component, and reference configurations. The illustrated HTM structure includes a hierarchy of levels having memory nodes where the memory nodes include temporal memory space and spatial memory space. Inputs may be fed into the memory nodes in a multi-hierarchical manner. The memory nodes identify combinations of the inputs often received as causes and store the identified combinations of the inputs in spatial memory. The memory nodes further identify sequential combinations of the inputs often received as temporal groups and store the identified sequential combinations of the inputs in the temporal memory. Based on stored causes and/or temporal groups, the memory nodes generate predictions with probabilities, where the predictions with the highest probabilities are passed as beliefs to a next higher level of memory nodes in the HTM as inputs. In an embodiment, a user may load the HTM structure 700 with initial causes and temporal groups so that it can begin inferring when new input data is fed into its nodes.

In this embodiment, the HTM is employed to predict a configuration of a service connected to a component when the user deploys the process. Inputs may be a Port 701, a Name 702, or other relevant data provided by a user. These inputs are multi-hierarchically fed into memory nodes labeled as HTTP Connector 703, SOAP over HTTP Service 704, SOAP over JMS Service 704, BPEL Component 704, JAVA Component 704, Service 705, Wire 705, Component 705, or Composite 707. There may be other exemplary embodiments of components and services. There may also be embodiments that predict references in addition to components and services.

VIII. Application in a Managing & Monitoring System

An embodiment of the predictive system may further comprise other components capable of predicting particular aspects of managing and monitoring enterprise applications. An embodiment may comprise three components, an application deployment component, an application management component, and an application monitoring component. An embodiment of the application deployment component functions substantially the same as the aforementioned predictive system for deploying enterprise applications. Each of these components are equipped with predictive systems.

In an embodiment, the application deployment component provisions an application based on the deployment artifact provided. In most administrators, the application artifact is provisioned as is, or a user configures the application components that need to be provisioned based on the preferred configuration parameters. The application deployment component will comprise an intelligent agent framework based on an HTM that contains multiple sub-agents that predict on the optimum configuration. There will be a hierarchy of intelligent agents making predictions on the configuration aspects of the various components. An example embodiment of the hierarchy of the intelligent systems that assist in deployment may look like the following:

---

Application Deployment Intelligent Agent
    Service Deployment Intelligent Agent
        SOAP over HTTP Service Deployment Intelligent Agent
    BPEL Component Deployment Intelligent Agent
    Reference Deployment Intelligent Agent
        SOAP over HTTP Reference Deployment Intelligent Agent

---

In an embodiment, the application deployment intelligent agent may be responsible for predicting the application configuration that allows the most optimum way for deploying the application. It may further comprise sub-agents that predict on specific application components. All predictions will be merged into sequences of steps ranging from the most optimal to the least. In an embodiment, three most optimum sequences of steps or options may be presented to the user.

For example, selecting a software port for an HTTP listener may be the task to be predictably configured. In current administrators, the port is defined in configuration files and there is a chance that that particular port has already been deployed to another service. Thus, the predictive system would select a next available port. The predictive system may employ the HTM and predict based on profiles of the user, company, department, and also on the application artifact involved. The predictive system will be based on learning the patterns from a successfully deployed application and associating it with the profile of the user, company, and department. Other variables may also be employed.

To further the example stated above, assume that the application at issue is a bank building software application. Software engineers would have to build it and quality assurance (QA) engineers would have to test it. In most cases, the developers write and test the core functionality of the component they are building, thereby allowing the QA engineers to perform more in-depth testing. The predictive system would be useful in such a case. The learning process for such a system begins on a first successful application deployment. But also, similar data from previous successful application deployments for similar bank software may be loaded on to the predictive system's HTMs. Based on the application configurations, each memory node stores the predictions and propagates a belief based on a particular application configuration input. Say a developer deployed this application, and for example, her profile states that the management system can choose any port number for an HTTP listener. Assuming that 90% of the times the developer lets the predictive system deploy the application (remaining 10% is where she manually selects the port number, e.g. between ports 8000-9000), the memory nodes for the HTM that predict on the port number based on the developer profile will have the prediction "choose any available port number" at 90% and the predictions of port number between ranges collectively at 10%. The HTM for the entire bank example is shown in FIG. 10.

After the system learns how this particular developer likes to deploy an application, on any further deployment having an HTTP listener port selection, the system will be able to provide the user with three choices: (1) choose any available port; (2) choose between 8000-9000; and (3) choose between 7000-8000. Similarly, for a QA engineer who wants to test the HTTP listener for all available port ranges, the HTM will predict based on what it learned from this particular QA engineer. If the QA engineer chooses a port between 1000-9000 with equal probability, on next deployment, the QA engineer will be presented with the random choice of the port number ranges.

Port number and selection was provided in this embodiment for illustrative purposes. Other aspects may be predicted in substantially the same way.

IX. Example HTM Operations

FIG. 8(a) is a schematic diagram illustrating a user interface interacting with a predictive system 811(a) for designing enterprise applications. When a user selects tasks including a service, a link, and a component, data of the tasks get fed into the memory nodes of the HTM of the predictive system 811(a). Memory nodes of the HTM of the predictive system 811(a) then identify causes and temporal groups of the data of the tasks. The memory nodes then generate beliefs based on the identified causes and temporal groups, which allows the predictive system 811(a) to make two predictions, one of a next component 802(a) and one of a next reference 803(a). These predictions are presented to the user as design options, which the user will be able to select from. Once the user selects one of the two options, data of the selected option may then be fed into the HTM of the predictive system 811(a). The memory nodes of the HTM will then identify causes and temporal groups of the new data. This process can continue until the user has completed the design process. Thus, the predictive system 811(a) assists the user in designing a business process by predicting the next task or component of the business process. While this embodiment illustrates the predictive system 811(a) for designing a business process, other embodiments may be used for deploying, managing, or monitoring an enterprise application.

FIG. 8(b) is a schematic diagram illustrating a user interface interacting with a predictive system 811(b) for deploying enterprise applications. When a user selects tasks, they get fed into the memory nodes of the HTM of the predictive system 811(b). The predictive system 811(b) then outputs two predictions in basic language. In this embodiment, the configuration options use different sub components such as different HTTP Connectors, HTTP Ports, or Nodes. But the predictive system may generate configuration options for other enterprise applications.

While embodiments shown in FIGS. 8(a)-8(b) generate two predictions, other embodiments may generate any number of predictions as desired by the user. These embodiments refer to deploying enterprise applications, but there may be similar embodiments employing the HTM structure to predict a sequence for modeling an application, managing an application, or monitoring an application. In these embodiments, a profile of a user, a department, a company, and an enterprise application may be fed into the memory nodes as inputs.

While embodiments shown in FIGS. 4(a), 4(b), 6(a), and 6(b) illustrate inputs that are fed into the HTM in real-time, there may be embodiments where stored data comprising causes and temporal groups information may be fed into the HTM.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents.

For example, as referred to herein, a user interface may be a virtual machine, computer, or host. Also as referred to herein, a network may refer to communication channels that facilitate communications between user interfaces and the predictive system. A network may also refer to a communication medium between processes on the same machine. Also as referred to herein, a server is a machine deployed to execute a program operating as a socket listener and may include software instances. Examples of a processor include digital signal processors (DSPs), application-specific integrated circuits (ASICs), field-programmable gate arrays (FPGAs), and any other suitable specific or general purpose processors.

Memory may store any suitable information. Memory may comprise any collection and arrangement of volatile and/or non-volatile components suitable for storing data. For example, memory may comprise random access memory (RAM) devices, read-only memory (ROM) devices, magnetic storage devices, optical storage devices, and/or any other suitable data storage devices. In particular embodiments, memory may represent, in part, computer-readable storage media on which computer instructions and/or logic are encoded. Memory may represent any number of memory components within, local to, and/or accessible by a processor.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and time such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. An enterprise application design system for predicting a sequence of operations for designing an enterprise application, the system comprising:
  a memory that stores computer instructions for designing or predicting the sequence of operations;
  hierarchical temporal memories configured to:
  store modeling data related to models of previously designed enterprise applications;
  receive input data related to designing the enterprise application; and
  predict one or more next operations based on the input data and the modeling data; and
  a processor in communication with the memory and with the hierarchical temporal memories, the processor operable to execute the computer instructions and to design the enterprise application in accordance with the predicted one or more next operations.

2. The system of claim 1, wherein the hierarchical temporal memories comprise a hierarchy of levels each comprising one or more memory nodes, wherein higher level memory nodes receive information from lower level memory nodes as inputs.

3. The system of claim 2, wherein the one or more memory nodes identify combinations of the inputs received as causes and store the identified combinations of the inputs in spatial memory.

4. The system of claim 3, wherein the one or more memory nodes further identify sequential combinations of the inputs often received as temporal groups and store the identified sequential combinations of the inputs in temporal memory.

5. The system of claim 4, wherein a stored database of causes and temporal groups is received by the hierarchical temporal memories.

6. The system of claim 4, wherein the one or more memory nodes generate probability information as beliefs that one or more of the inputs are associated with one or more of the causes and with one or more of the temporal groups.

7. The system of claim 6, wherein beliefs output from lower level memory nodes enter higher level memory nodes as inputs.

8. The system of claim 7, wherein the one or more memory nodes output a pre-specified number of beliefs based on the probability information, wherein the pre-specified number of beliefs comprises causes and temporal groups with the highest probabilities at a highest level of the temporal hierarchical memories.

9. The system of claim 1, wherein the modeling data or the input data is associated with one or more of a task and a link used for creating a business process.

10. The system of claim 1, wherein the hierarchical temporal memories predict based on topology patterns.

11. The system of claim 1, wherein the hierarchical temporal memories predict based on process patterns or process component patterns, further wherein the hierarchical temporal memories comprise a space for temporal patterns and a space for spatial patterns.

12. The system of claim 1, wherein the modeling data stored at the hierarchical temporal memories is dynamic.

13. The system of claim 1, wherein the modeling data stored at the hierarchical temporal memories is associated with learned behaviors.

14. The system of claim 1, wherein the hierarchical temporal memories further predict based on a current state.

15. A method for predicting a sequence of operations of an enterprise application design system, the method comprising:

storing, in a memory, computer instructions for predicting the sequence of operations;

storing, in one or more hierarchical temporal memories, modeling data related to models of previously designed enterprise applications;

receiving, at the one or more hierarchical temporal memories, input data related to an enterprise application; and predicting one or more next operations based on the input data and the modeling data.

16. The method of claim 15, wherein the hierarchical temporal memories comprise a hierarchy of levels each comprising one or more memory nodes, wherein higher level memory nodes receive information from lower level memory nodes as inputs.

17. The method of claim 16, wherein the one or more memory nodes identify combinations of the inputs received as causes and store the identified combinations of the inputs in spatial memory.

18. The method of claim 17, wherein the one or more memory nodes further identify sequential combinations of the inputs received as temporal groups and store the identified sequential combinations of the inputs in temporal memory.

19. The method of claim 18, wherein a stored database of causes and temporal groups is received by the hierarchical temporal memories.

20. The method of claim 18, further comprising:
generating probability information as beliefs that one or more of the inputs are associated with one or more of the causes and with one or more of the temporal groups.

21. The method of claim 20, wherein beliefs output from lower level memory nodes enter higher level memory nodes as inputs.

22. The method of claim 21, further comprising outputting a pre-specified number of beliefs based on the probability information,
wherein the pre-specified number of beliefs comprises causes and temporal groups with the highest probabilities at a highest level of the temporal hierarchical memories.

23. The method of claim 15, wherein the input data or the modeling data comprises one or more of behavior associated with a task and a link used for creating a business process.

24. The method of claim 15, wherein the hierarchical temporal memories predict based on topology patterns.

25. The method of claim 15, wherein the hierarchical temporal memories predict based on process patterns or process component patterns, further wherein the hierarchical temporal memories comprise a space for temporal patterns and a space for spatial patterns.

26. The method of claim 15, wherein the modeling data stored at the hierarchical temporal memories is dynamic.

27. The method of claim 15, wherein the modeling data stored at the hierarchical temporal memories is associated with learned behaviors.

28. The method of claim 15, wherein the predicting is further based on a current state.

29. The system of claim 1, wherein the modeling data comprises data related to models of previously deployed enterprise applications or data related to components of the models of the previously deployed enterprise applications.

30. The method of claim 15, wherein the modeling data comprises data related to models of previously deployed enterprise applications or data related to components of the models of the previously deployed enterprise applications.

31. The system of claim 1, wherein the hierarchical temporal memories predict based on at least one of model topologies, composite models, and composite model components.

32. The system of claim 1, wherein the hierarchical temporal memories comprise at least one of a space for temporal patterns and a space for spatial patterns.

33. The system of claim 1, wherein storing the modeling data further comprises storing modeling data related to models of previously deployed enterprise applications, wherein receiving the input data further comprises receiving input data related to deploying the enterprise application, and wherein the processor is further operable to deploy the enterprise application in accordance with the predicted one or more next operations.

34. The method of claim 15, wherein the hierarchical temporal memories predict based on at least one of model topologies, composite models, and composite model components.

35. The method of claim 15, wherein the hierarchical temporal memories comprise a space for temporal patterns and a space for spatial patterns.

36. The method of claim 15, wherein storing the modeling data further comprises storing modeling data related to models of previously deployed enterprise applications.

* * * * *